US007958256B2

(12) United States Patent  (10) Patent No.: US 7,958,256 B2
Keeler  (45) Date of Patent: Jun. 7, 2011

(54) SYSTEM AND METHOD FOR PROVIDING APPLICATION CATEGORIZATION AND QUALITY OF SERVICE IN A NETWORK WITH MULTIPLE USERS

(75) Inventor: James D. Keeler, Austin, TX (US)

(73) Assignee: Wayport, Inc., Irving, TX (US)

( * ) Notice: Subject to any disclaimer, the term of this patent is extended or adjusted under 35 U.S.C. 154(b) by 348 days.

(21) Appl. No.: 12/118,160

(22) Filed: May 9, 2008

(65) Prior Publication Data

US 2008/0281979 A1  Nov. 13, 2008

Related U.S. Application Data

(60) Provisional application No. 60/917,004, filed on May 9, 2007.

(51) Int. Cl.
G06F 15/16 (2006.01)
(52) U.S. Cl. ........................................ 709/233; 709/232
(58) Field of Classification Search .................. 709/232, 709/233, 220, 226, 227
See application file for complete search history.

(56) References Cited

U.S. PATENT DOCUMENTS

| 6,047,322 | A | 4/2000 | Vaid et al. |
| 6,343,073 | B1 * | 1/2002 | Mashinsky ..................... 370/352 |
| 7,664,048 | B1 * | 2/2010 | Yung et al. ..................... 370/253 |
| 2002/0095684 | A1 * | 7/2002 | St. John et al. ................. 725/95 |
| 2004/0165588 | A1 | 8/2004 | Pandya |
| 2005/0080888 | A1 | 4/2005 | Walter |
| 2005/0261970 | A1 | 11/2005 | Vucina et al. |

FOREIGN PATENT DOCUMENTS

| EP | 0944209 | 9/1999 |
| WO | 9826510 | 6/1998 |
| WO | 2006108282 | 10/2006 |

OTHER PUBLICATIONS

European Search Report dated Aug. 26, 2008, App. No. 08251654.3, Applicant: Wayport, Inc., Berlin, Aug. 14, 2008, EPO.

Venkataramani, et al, TPC Nice: A Mechanism for Background Transfers, Laboratory of Advanced Systems Research, Dec. 2002, Department of Computer Science, University of Texas at Austin.
Rejaie, et al, An End-to-End TCP-Friendly Architecture for Realtime Playback Applications Over the Internet, Aug. 19, 1998, Computer Science Department, University of Southern California. Du et al, QoS in an Open Architecture of Real-Time ODP, Mathematics and Computer Science Dept., Kent State University.
Cen et al, Flow and Congestion Control for Internet Media Streaming Applications, Department of Computer Science and Engineering, Oregon Graduate Institute of Science and Technology.
Rejaie et al, RAP: An End-to-End Rate-Based Congestion Control Mechanism for Realtime Streams in the Internet, Jul. 20, 1998, Computer Science Department, University of Southern California.
Busse et al, Dynamic QoS Control of Multimedia Applications Based on RTP, Mar. 17, 1995, Berlin, Germany.
W. Stevens, TCP Slow Start, Congestion Avoidance, Fast Transmit and Fast Recovery Algorithms, RFC: 2001, Category: Standards Track, Jan. 1997.

* cited by examiner

*Primary Examiner* — Philip J Chea
(74) *Attorney, Agent, or Firm* — Dillon & Yudell LLP

(57) ABSTRACT

Internet protocol (IP) data service providers may provide several services over a single communications channel and/or circuit. For example, the provider may deliver public services such as Wi-Fi, content, gaming, etc. as well as business-critical "back-office" services such as credit card processing, VoIP, streaming video, video conferencing, etc. Some applications can very demanding from a quality of service standpoint, whereas other applications are unwanted or unauthorized on the network such as worms, viruses, denial of service attacks and/or certain types of peer-to-peer file sharing applications. Applications sharing the communication channel may be classified into one or more application classifications. The available bandwidth over the communications channel and/or circuit may then be managed via a prioritization system that can be parameterized based on the available bandwidth and/or the desired application behavior for given characterized applications. Many of the above unwanted applications can be suppressed, after being classified.

26 Claims, 13 Drawing Sheets

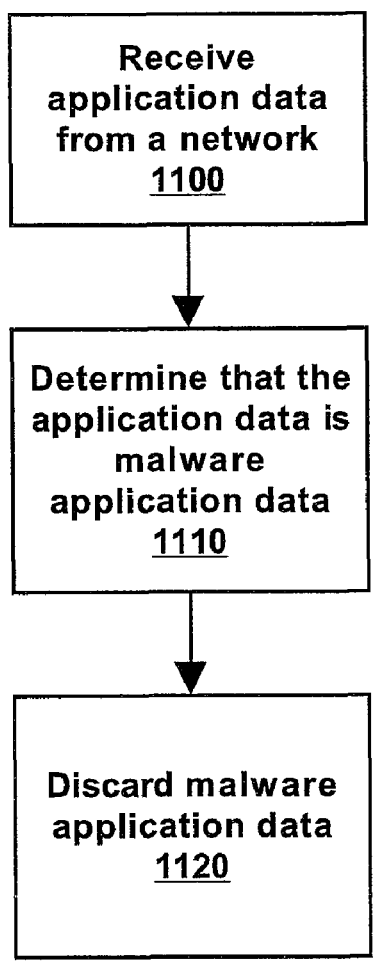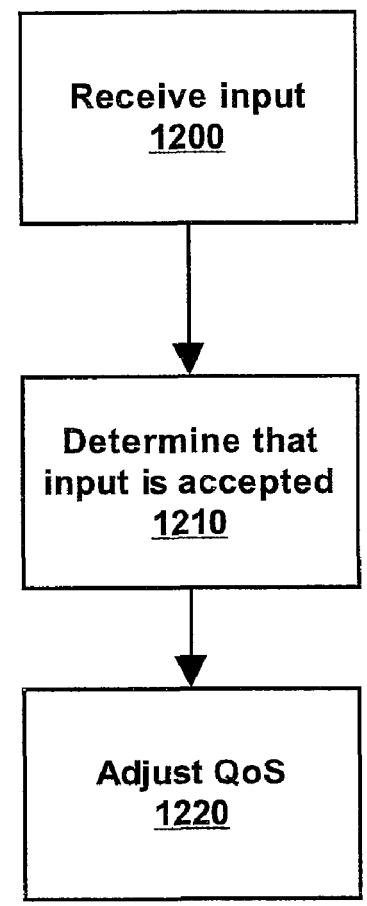
FIG. 11
FIG. 12

SYSTEM AND METHOD FOR PROVIDING APPLICATION CATEGORIZATION AND QUALITY OF SERVICE IN A NETWORK WITH MULTIPLE USERS

PRIORITY CLAIM

This application claims benefit of U.S. Provisional Application No. 60/917,004, filed May 9, 2007, titled "SYSTEM AND METHOD FOR PROVIDING APPLICATION CATEGORIZATION AND QUALITY OF SERVICE IN A NETWORK WITH MULTIPLE USERS" the contents of which is incorporated herein by reference in its entirety.

BACKGROUND

1. Field of the Invention

This invention is in the field of Internet access, more specifically, Internet access with two or more of users wherein the quality of service on the network is managed via a network traffic classification system and various quality of service methods and systems.

2. Description of the Related Art

Several Internet service providers (ISPs) provide services at public venues such as hotels, airports, restaurants (so-called "hot-spots"). ISPs may also provide distributed access in metropolitan area networks or other venues. The site may have two or more of portable computing devices as well as back office devices connected to the network, each with one or more network-enabled applications running on each device. Some applications require a high quality of service (QoS), but in the current state of the art, only minimal quality of service is available for the customer. If any quality of service is available, it is usually categorized as "free" shared bandwidth over a small amount of bandwidth versus premium bandwidth that can be purchased (also shared). For example, some hotels offer free network access at 128 kbps, then allow customers to pay for access to the remainder of a T-1 or other broadband access (1.54 mbps). Whereas this allows for some segregation and prioritization of applications, it is insufficient to provide for the bandwidth for many types of applications. Furthermore, there is no protection from unwanted application types such as worms, viruses, and/or certain types of peer-to-peer file sharing applications.

High-speed Internet access (HSIA) is a necessity for many business travelers. HSIA uses a broadband connection, typically defined in telecommunication terminology as anything greater than 200 kbps (200 kilobits/second). However, most customers are used to having much more than that available at their home or office. Often a home user will have a DSL connection or a cable modem with more than 1 mbps (1 megabit per second) downstream and greater than 0.5 mbps upstream. Note that in the home environment, this bandwidth is usually used by a single person rather than being shared between many users. As the user travels to hotels, airports, or hotspots, they expect a fast connection while on the road.

Early in the deployment of HSIA into hotels (e.g., back in 2000/2001), a single T-1 (1.5 Mbps) was typically provisioned for a hotel. Because the number of guests actually using the HSIA was small (e.g., less than 1% take rate in 2001), the circuit was underutilized with plenty of capacity for more users. However, as the number of users has increased over the years (e.g., now averaging 20% and in some locations greater than 75% of occupied rooms), the demand for more bandwidth has increased. In addition to the increase in the number of guests using the system, the types of applications have also become more bandwidth intensive. Certainly e-mail is one of the most common applications, and is typically low bandwidth, but it is now fairly common to have 10-20 megabyte file attachments in e-mail. Moreover, on-line video such as YouTube, MySpace, as well as news and sports clips are very bandwidth intensive. Thus, a T-1 in a large hotel can become saturated with business traffic and larger hotels may have to upgrade to multi-T-1 or other higher-bandwidth connectivity solutions to keep up guest demands.

Whereas the bandwidth consumption for legitimate uses of the Internet has increased rapidly over the past several years, other factors also can consume a large amount of bandwidth. One of the most aggressive classes of consumers of bandwidth is the peer-to-peer file sharing applications such as BitTorrent, LimeWire, Kazaa, Gnutella, eDonkey, etc. These applications can connect to other peers on the network and download/upload large files (multi-gigabyte files in some cases). These applications automatically adjust to consume as much bandwidth as is available. Hence, a single client running a peer-to-peer application on a hotel can chew up all of the available bandwidth at the hotel, leaving other users with inadequate bandwidth for their needs. Clearly this is an undesirable situation for the hotel guest. One way of solving this is for hoteliers to continue upgrading circuit bandwidth (e.g. multi-T1, a DS-3 or and/or a metro Ethernet connection) to keep up with the demand. The problem with that is that no matter how big the pipe is, it can be consumed by the peer-to-peer applications.

In addition to peer-to-peer applications, other factors can also affect bandwidth. Malware (e.g., worms, viruses, Trojan horses, etc.) can spread and consume a large amount of bandwidth on a property. Thus a malware suppression system is needed to prevent these from negatively impacting users.

Whereas there are several companies that provide "bandwidth shaping", "traffic shaping", and/or "packet shaping" technologies, there is a need to provide a system that allows customers to purchase a particular amount of bandwidth for a particular application.

BRIEF DESCRIPTION OF THE DRAWINGS

The preferred embodiments will become apparent upon reading the following detailed description and upon reference to the accompanying drawings in which:

FIG. 11 illustrates a flowchart diagram of a method, according to various embodiments;

FIG. 12 illustrates a flowchart diagram of a method, according to various embodiments.

Figure 1:
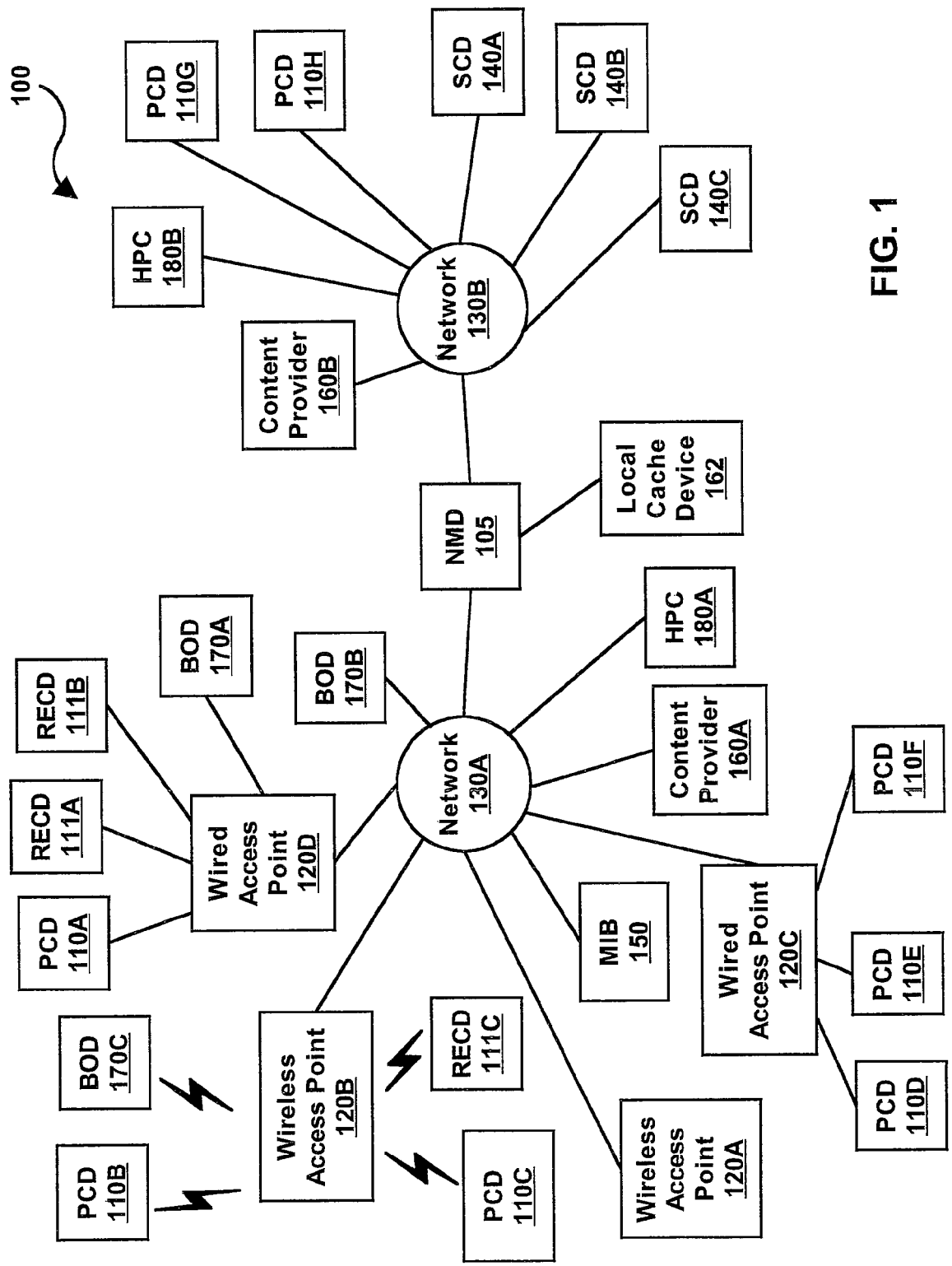
FIG. 1 is a block diagram of a network communication system, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

U.S. Provisional Application No. 60/917,004, filed May 9, 2007, titled "System and method for providing application categorization and quality of service in a network with multiple users" is hereby incorporated by reference in its entirety as though fully and completely set forth herein.

U.S. patent application Ser. No. 10/851,633 titled "Method for providing wireless services" and filed on May 21, 2004, whose inventor are David J. Vucina, Gregory G. Williams, James D. Keeler, Scott W. Martin, and Todd L. Mathis, is hereby incorporated by reference in its entirety as though fully and completely set forth herein.

Turning now to FIG. 1, a network communication system (NCS) 100 is illustrated, according to various embodiments. NCS 100 may include one or more access points (APs) such as APs 120A-120D. In various embodiments, wired APs 120C-120D may each communicate with one or more computing devices in a wired fashion. For example, wired access point (AP) 120C may communicate with portable computing devices (PCDs) 110D-110F in a wired fashion, and wired AP 120D may communicate with portable computing device (PCD) 110A in a wired fashion. In some embodiments, wireless APs 120A-120 may each communicate with one or more computing devices in a wireless fashion. For example, wireless AP 120B may communicate with a PCD 110B and/or a PCD 110C, and wireless AP 120A may communicate with other computing devices. Each of wireless APs 120A-120B may include a wireless transceiver and may operate according to one or more wireless standards, such as Institute of Electrical and Electronics Engineers (IEEE) 802.16, wireless Ethernet (IEEE 802.11), Bluetooth (IEEE 802.15), General Packet Radio Service (GPRS), CDMA (code division multiple access), TDMA (time division multiple access), FDMA (frequency division multiple access), ultra wide band, digital, and/or infrared communication technologies, among others.

Each of APs 120A-120D may be coupled to a network 130A. Network 130A may be coupled to a network management device (NMD) 105. NMD 105 may be coupled to a network 130B. In various embodiments, NMD 105 may provide authentication, quality of service (QoS), communication traffic shaping, and/or access control from one or more computing devices (e.g., PCDs 110A-110F, retail entity computing devices (RECDs) 111A-111C, and back office devices (BODs) 170A-170C) coupled to network 130A through one of APs 120A-120D to network 130B. In some embodiments, NMD 105 may include an access control mechanism and/or a firewall mechanism. For example, the access control mechanism and/or the firewall mechanism may be used in conducting data communications in accordance and/or in association with providing various qualities of services and/or traffic shaping.

In some embodiments, NCS 100 may include a historical pattern classifier (HPC) 180A coupled to network 130A and/or a HPC 180B coupled to network 130B. Each of HPC 180A-180B may respectfully include a memory medium and/or a processor. HPC 180A may monitor at least a portion of network traffic of network 130A, and HPC 180B may monitor at least a portion of network traffic of network 130B. In various embodiments, the memory medium of HPC 180A may store various histories of network traffic of network 130A, and/or the memory medium of HPC 180B may store various histories of network traffic of network 130B. These various histories may include information regarding bandwidth utilization information, transfer amount information, time information, network utilization information, and/or various information associated with and/or corresponding to data 400, described below with regard to FIG. 4. In various embodiments, at least one of HPC 180A-180B may determine various computing device application classifications based on the various histories. For example, determining the various computing device application classifications may include using one or more time-series based pattern classification methods such as a neural network, a time-delay neural network, a Bayesian classifier, a learning vector quantization system and/or similar pattern recognition/classification methods, among others. In various embodiments, HPC 180A and/or HPC 180B may be accessed and/or queried to determine a computing device application classification.

In various embodiments, network 130A and/or network 130B may include a wired network, a wireless network or a combination of wired and wireless networks. Network 130A and/or network 130B may include and/or be coupled to various types of communications networks, such as a public switched telephone network (PSTN), an Internet, a wide area network (WAN) (e.g., a private WAN, corporate WAN, etc.), a local area network (LAN). Thus, NMD 105 may be coupled to a PSTN, e.g., Ethernet cable and DSL; a cable (television) based network; a satellite-based system; and/or a fiber based network; among others.

In some embodiments, network 130A and/or network 130B may include one or more wireless networks, e.g., based on IEEE 802.11 and/or IEEE 802.16. For instance, one or more wired and/or wireless APs 120A-120D may be coupled to network 130A in a wireless fashion. Network 130A and/or network 130B may include one or more DSL (digital subscriber line) and/or cable (e.g., cable television) networks and/or infrastructures. For example, network 130A and/or network 130B may include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In various embodiments, network 130B may form part of the Internet, or may couple to other networks, e.g., other local or wide area networks such as the Internet.

In various embodiments, access to these networks may include one or more "services" these networks may provide. For example, these one or more services may include: email, world wide web, file transfer, printing, file sharing, file system sharing, remote file system, network file system (NFS), news, multicast, netbios, encryption, domain name service (DNS), routing, tunneling, chat such as Internet Remote Chat or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, or video, among others. In some embodiments, these one or more service may be associated with and/or correspond to one or more protocols of one or more computer and/or software applications.

NCS 100 may include one or more content providers 160A-160B. In some embodiments, content provider 160A may be coupled to network 130A. In some embodiments, content provider 160B may be coupled to network 130B. Content provider 160A and/or content provider 160B may provide content such as audio, video, text, pictures, and/or maps among others through one or more protocols. Some or all of the information from content provider 160A and/or content provider may be pre-distributed to a local cache device 162 (such as a computer system, a computer hard drive, and/or other memory media) which may facilitate faster local access to the content and/or which may minimize delays and/or costs of transmitting the content through network 130B.

The content may be based on a retail entity and/or one or more promotions of the retail entity. For example, the content may be entertainment type content to entice customers into the retail entity locations. For example, for a fast food restaurant, such as a McDonalds, content may be provided that is geared to children, such as games based on current McDonalds promotions or themes, etc. In some embodiments, network access to this type of enticement content may be given freely to purchasing customers to entice them to visit the retail location. This type of network content may be provided in lieu of traditional "plastic toys" or other items routinely given out to children in these restaurants.

In some embodiments, content provider 160A and/or content provider 160B may provide content that may be used by a business itself, e.g., content to train employees of the retail entity and/or provide necessary business information. In some embodiments, NMD 105 may include content provider 160A or the content and/or functionality of content provider 160A. A portion or all of the content may be cached on the local cache device 162.

NCS 100 may include a management information base (MIB) 150. MIB 150 may be coupled to network 130A. MIB 150 may be a mechanism, such as a memory, which may allow the persistent storage and management of information that may be used by network 130A to operate. In some embodiments, MIB 150 may store a data structure, such as a table comprising a list of identification information and a corresponding list of the plurality of possible networks and/or services. The data structure may also store access information, which may include associated methods for providing data to/from the respective plurality of possible networks and/or services. The access information may include access level and/or privilege level information. The data structure may include a table having a plurality of tuples, with each tuple having the identification information. In various embodiments, the data structures that store this information may be included in each of the APs 120A-120D, or may be provided in various other locations.

MIB 150 may store other information, such as a directory of one or more of the elements (e.g., access points, computing devices, etc) in NCS 100, network topology information, characteristics of individual network elements, characteristics of connection links, performance and trend statistics, and/or any information that may be of interest in operating network 130A. For example, MIB 150 may store longitude, latitude, altitude and/or other geographic information that may be used to locate one or more access points and/or one or more geographic regions.

In some embodiments, NMD 105 may be a computer system operable to include one or more of MIB 150, network 130A, various networking equipment, one or more APs 120A-120D, and/or one more historical pattern classifiers (HPCs) 180A-180B, among others.

In various embodiments, a user operating a PCD (e.g., one of PCDs 110A-110F) may communicate with one of the APs 120A-120D to gain access to a network and its services, such as the Internet. One or more of PCDs 110B-110C may have a wireless communication device, e.g., a wireless Ethernet card, for communicating with one or more of the wireless APs 120A-120B. One or more of PCDs 110A and 110D-110F may have a wired communication device, e.g., an Ethernet card, for communicating with one or more of the wired APs 120C-120D. In various embodiments, one or more of PCDs 110A-110F may be any of various types of devices, including a computer system, such as a portable computer, a personal digital assistant (PDA), a mobile telephone (e.g., a cellular telephone, a satellite telephone, etc.), an Internet appliance, a communications device, or other wired or wireless device. PCD 110 may include various wireless or wired communication devices, such as a wireless Ethernet card, paging logic, RF (radio frequency) communication logic, a wired Ethernet card, a modem, a DSL device, an ISDN device, an ATM (asynchronous transfer mode) device, a parallel or serial port bus interface, and/or other type of communication device.

In some embodiments, one or more of PCDs 110A-110F may include a memory medium which stores identification information. The identification information may be a System ID (an IEEE 802.11 System ID), a processor or CPU ID, a Media Access Control (MAC) ID of a wireless or wired Ethernet device, network identification information, and/or other type of information that identifies the portable computing device. The identification information may be included in a digital certificate (e.g., an X.509 certificate), which may be stored in a web browser, in a client software, and/or in a memory medium of the portable computing device.

In communicating with wireless APs 120A-120B, the wireless communication may be accomplished in a number of ways. In some embodiments, one or more of PCDs 110B-110C and wireless APs 120A-120B may be equipped with appropriate transmitters and receivers compatible in power and frequency range (e.g., 900 MHz, 2.4 GHz, 3.6 GHz, 5 GHz, among others) to establish a wireless communication link. Wireless communication may also be accomplished through cellular, satellite, digital, and/or infrared communication technologies, among others. To provide user identification and/or ensure security, a portable computing device and/or wireless AP may use any of various security systems and/or methods.

In communicating with wired APs 120C-120D, the wired connection may be accomplished through a variety of different ports, connectors, and/or transmission mediums. For example, one or more PCDs 110A and 110D-110F may be connected through an Ethernet, universal serial bus (USB), FireWire (IEEE 1394), serial, or parallel transmission cables, among others. One or more of PCDs 110A and 110D-110F may include various communication devices for connecting to one of the wired APs 120C-120D, such as wired Ethernet cards, modems, DSL adapters, ATM adapters, IDSN devices, or other communication devices. In one example, a hotel may have Ethernet connections in the restaurants, shops, meeting rooms, and/or guest rooms. In a second example, a fast-food restaurant and/or a coffee shop may have both wireless and wired connections for mobile users. A user may connect to a wired AP 120C through the use of a laptop computer (e.g., one of PCDs 110D-110F), an Ethernet network card, and a network cable. This connection may have the same impact as a connection made to a wireless AP 120B. In other words, a user using a wired portable computing device may be able to use various network infrastructures in the same manner as a user using a wireless portable computing device.

In some embodiments, one or more a back office devices (BODs) 170A-170C may be coupled to network 130A. For example, one or more of a BODs 170A-170C may include a cash register, a point of sale (POS) terminal, a smart card reader, a camera, a bar code reader, a radio frequency identification (RFID) reader, a credit card reading mechanism, and/or a remote order placing device, among others. In some embodiments, the remote order placing device may allow a retail entity to remotely accept orders from customers using the remote order placing device. For example, a customer may use a "drive-thru" window and the remote order placing device at one location, and the retail entity may accept the order at another location. For instance, the retail entity may accept orders in a first city from customers using the remote order placing device in a different second city.

In various embodiments, one or more of BODs 170A-170C may be configured to contact a clearinghouse through one or more networks (e.g., one or more of networks 130A-130B) to debit one or more credit and/or debit card accounts. One or more of BODs 170A-170C may include other mechanisms to identify a customer and/or customer account information. The POS terminal may include a smart card reader. In some embodiments, a back office device (BOD) may be coupled to a network through a wired AP. For example, BOD 170A may be coupled to network 130A through wired AP 120D. In various embodiments, a BOD may be coupled to a network in a wireless fashion. For example, BOD 170C may be coupled to network 130A through wireless AP 120B.

In various embodiments, NCS 100 may be geographic-based. In other words, the NCS 100 may provide information and/or services to a portable computing device (e.g., one of PCDs 110A-110F) of a user based at least partly on the geographic location of the portable computing device, e.g., as indicated by one or more of APs 120A-120D and/or as indicated by geographic information (e.g., GPS information, fast-food restaurant and/or coffee shop location, room identification, room number, room name, and/or room area, among others) provided from the portable computing device. In some embodiments, one or more of APs 120A-120D may be arranged at known geographic locations and may provide geographic location information regarding the geographic location of the user and/or the portable computing device. In some embodiments, a computing device (e.g., one of PCDs 110A-110F, RECDs 111A-111C, and BODs 170A-170C) may provide geographic location information of the computing device through an access point (e.g., one of APs 120A-120D) to network 130A. For example, the computing device may include GPS (Global Positioning System) equipment enabling the computing device to provide its geographic location through the access point to network 130A.

In some embodiments, a retail entity computing device (RECD) may be coupled to network 130A. Retail entity computing devices (RECDs) 111A-111B may be coupled to network 130A in a wired fashion (e.g., through wired AP 120D) while RECD 111C may be coupled to network 130A in a wireless fashion (e.g., through wireless AP 120B). A retail entity may provide RECDs 111A-111C at various locations of the retail entity. RECDs 111A-111C may be used by customers of the retail entity to access content and/or network services offered at the various locations. In various embodiments, the retail entity may distribute access codes, and the access codes may be used to authenticate a user for service. For example, an access code may be used to authenticate a user for access to network 130B. One or more of RECDs 111A-111C may be "locked down" to prevent theft.

The retail entity may distribute access codes to access content through one or more of RECDs 111A-111C. For example, a customer of the retail entity may receive an access code and use the access code with RECD 111B to access content from one or more of content providers 160A-160B. In various examples, the content may include audio, video, maps, pictures, and/or text, among others. For instance, the content may include a movie trailer, a music video, and/or a computer-implemented game, web pages, graphics, and/or a digital magazine, among others. Some or all of the content may be cached on a local cache device 162. The content cache may be updated, replaced, or added to based on various factors including the date of the content (e.g. digital magazines and/or digital newspapers may be updated once/day or once/week), the local demographics or local area attractions, size of the data, available bandwidth for download, and/or other scheduled mechanism for updating the cached content.

In some embodiments, access codes to content may be provided to customers with a purchase of goods and/or services. For example, a customer may receive an access code to download a computer-implemented game. The computer-implemented game may be downloaded to one or more of PCDs 110A-110F, for instance. The access code to download a computer-implemented game may be distributed instead of a toy or trinket that may have accompanied a purchase of a meal. The computer-implemented game may include one or more digital rights management schemes. For instance, a digital rights management scheme may provide protection against further distribution of the computer-implemented game, e.g., not allowing distribution of the computer-implemented game to another computing device after it is downloaded. A digital rights management scheme may allow the computer-implemented game to only be played at a location of the retail entity.

Figure 2:
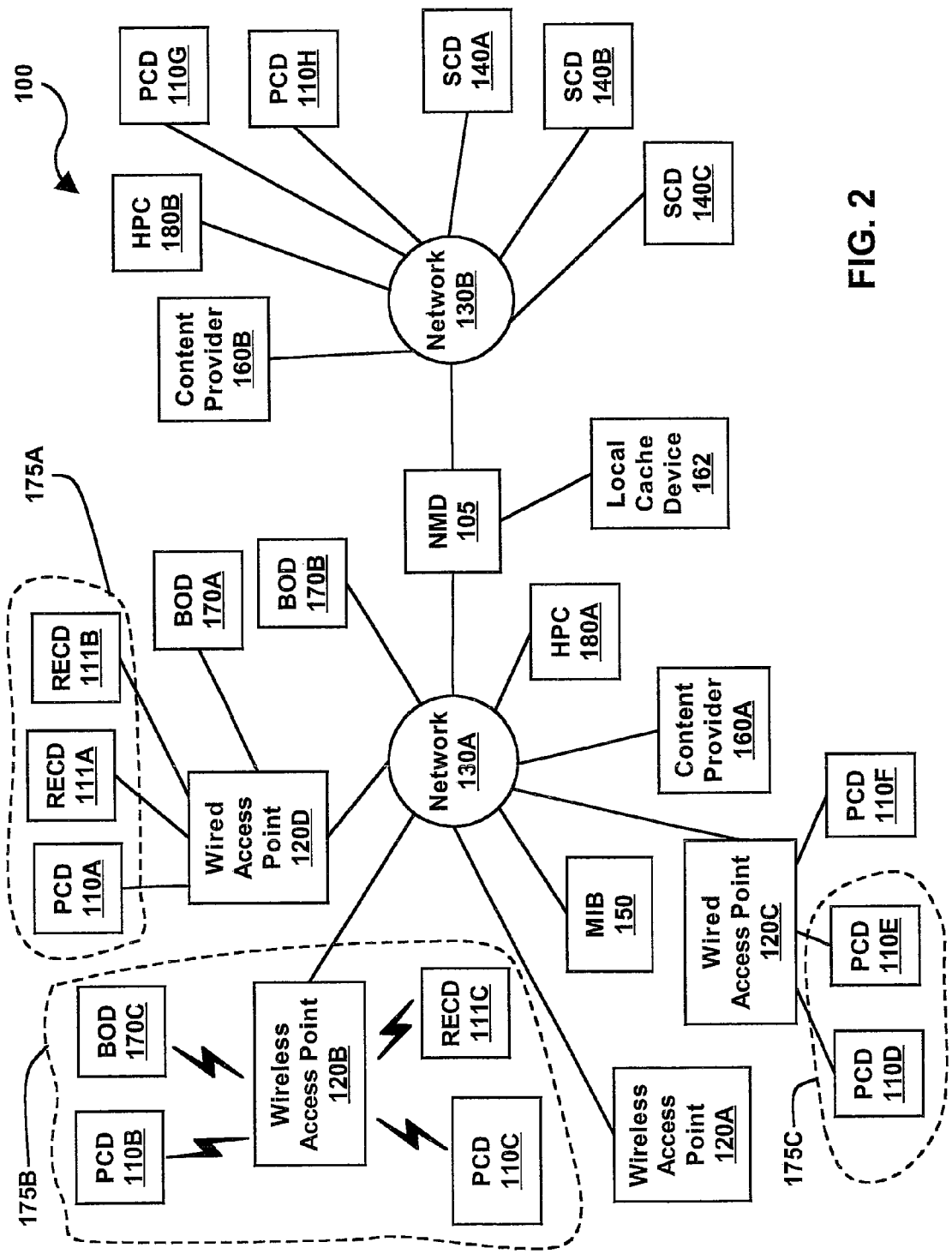
FIG. 2 is a block diagram of a network communication system, according to various embodiments.

In various embodiments, NMD 105 may service a single location. In some embodiments, NMD 105 may service two or more locations (e.g., locations 175A-175C), as shown in FIG. 2. For instance, each of various locations 175A-175C may include a portion of NCS 100. As described herein, a geographic location may include a geographic region. For instance, locations 175A-175 may be referred to as geographic locations and/or geographic regions, and they may include one or more areas of one or more sizes. In one example, location 175C may include a meeting room. In second example, location 175A may include a retail entity location, such as a coffee shop, a sandwich shop, a McDonalds location, etc. In another example, location 175B may include a city. More information regarding geographic location information may be found in U.S. Pat. No. 5,835, 061, referenced above.

In some embodiments, network 130A may support bandwidth shaping or traffic shaping. In various embodiments, a data rate and/or packet rate may be reserved for one or more computer systems at location 175A. For example, one or more of BODs 170A-170C may be able to use a data rate 728 kilobits per second (kbps) to transmit information to network 130B while one or more of PCDs 110A-110F may only be able to use 128 kbps to transmit information to network 130B. In some embodiments, traffic shaping may "deburst" and/or smooth traffic flows. For example, without traffic shaping, packets traversing network 130A may be: ten packets in a first second, 0 packets in a second second, and twenty packets in a third second. With traffic shaping, the thirty packets may traverse network 130A at ten packets per second, and more than three seconds may transpire before all thirty packets traverse network 130A.

In various embodiments, network 130A may support IEEE 802.1p, which provides various quality of service (QoS) and/or class of service (CoS). This may enable network 130A to enforce certain predefined quality of service metrics to any given port or virtual port included within network 130A. For instance, using QoS, network 130A may be operable to prioritize traffic and/or perform dynamic multicast filtering. In some embodiments, an IEEE 802.1p header may include a three-bit field for prioritization. For instance, this may allow network 130A to group data packets into various traffic classes. For example, using a three-bit field for prioritization may establish eight levels of priority. Network 130A may be configured with any prioritization mapping. In various embodiments, a prioritization mapping may be stored in memory coupled to network 130A, such as MIB 150, among others.

In some embodiments, NMD 105 and/or network 130A may prioritize network traffic based on one or more determined computer-based applications, software, and/or protocols. For example, it may be determined that one or more PCDs 110A-110F is running a VoIP application, and NMD 105 and/or network 130A may prioritize data and/or packets associated with the VoIP application to some QoS. In some embodiments, a prioritization mapping may map various applications, software, and/or protocols to various QoS metrics and/or to various prioritizations. In various embodiments, a prioritization mapping may map various compensation information and/or payment information to various QoS metrics and/or to various prioritizations. For example, at a venue (e.g., at a hotel, coffee shop, fast-food restaurant, etc.), a user of a computing device may purchase better and/or higher bandwidth and/or higher QoS, according to some metric, and the purchased QoS and/or bandwidth may be associated with and/or correspond to a geographic location of the computing device, a network identification associated with and/or corresponding to the computing device, and/or one or more applications and/or application classifications.

In various embodiments, a prioritization mapping may include a three-bit number (e.g., 000 through 111 in binary or, equivalently, 0 through 7 in decimal) associated with a priority level. In one instance, network-critical traffic such as a Routing Information Protocol (RIP) (e.g., RIP version 2) and/or an Open Shortest Path First (OSPF) table updates may be given a highest priority. For example, the highest priority may be seven in the prioritization mapping. Delay-sensitive applications such as interactive video and/or voice may be associated with moderately high priority values of five or six in the prioritization mapping. Other traffic or data classes may range from streaming multimedia and/to business-critical traffic, such as traffic from a database, down to "loss eligible" traffic. The streaming multimedia and/to business-critical traffic may be associated with moderate priority values around five or four in the prioritization mapping while the loss eligible traffic may be associated with a value of zero in the prioritization mapping. For example, a zero value may be used as a default. For instance, a zero value may be invoked automatically when no other value has been set.

In various embodiments, virtual local area networks (VLANs) and QoS may be used in tandem (e.g., IEEE 802.1q and IEEE 802.1p in tandem). In some embodiments, a VLAN tag may include two parts, a twelve-bit VLAN ID and a three-bit prioritization. In one example, this may allow network 130A to support one or more priority levels for one or more VLANs. In a second example, this may allow network 130A to support one or more priority levels within one or more VLANs.

One or more of the systems described herein, such as PCDs 110A-110H, APs 120A-120D, BODs 170A-170C, MIB 150, content providers 160A-160B, server computing devices (SCDs) 140A-140C, HPCs 180A-180B, and NMD 105 may include a memory medium on which computer programs and/or data according to the present invention may be stored. For example, each of the APs 120A-120D, HPCs 180A-180B, and/or MIB 150 may store a data structure as described above including information regarding identification information, application identification information, protocol identification information, corresponding networks, and/or access information such as associated data routing and/or QoS methods. Each of the APs 120A-120D, HPCs 180A-180B, and/or MIB 150 may further store a software program for accessing these data structures and using the information therein to properly provide or route data between personal computing devices and networks, and/or to selectively provide and/or route data depending on the access information and/or the QoS. In various embodiments, various of the systems and/or methods described herein may be used to "traffic shape", "network shape", and/or "packet shape".

The term "memory medium" and/or "computer readable medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may include other types of memory as well, or combinations thereof. In some embodiments, the memory medium may be an article of manufacture and/or a software product. In addition, the memory medium may be located in a first computer in which the programs are executed, or may be located in a second different computer and/or hardware memory device that connects to the first computer over a network. In some embodiments, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

In various embodiments, each of the systems described herein may take various forms, including a personal computer system, server computer system, workstation, network appliance, Internet appliance, personal digital assistant (PDA), laptop, mobile telephone, mobile multimedia device, embedded computer system, television system and/or other device. In general, the terms "computing device", "computer", and/or "computer system" can be broadly defined to encompass any device having a processor which executes instructions from a memory medium.

The memory medium in one or more systems thus may store a software program and/or data for performing and/or enabling access and/or selective network access and/or network service. A CPU or processing unit in one or more systems executing code and data from a memory medium includes a means for executing one or more software program according to the methods or flowcharts described herein.

Various embodiments further include receiving or storing instructions and/or data implemented in accordance with the present description upon a carrier medium. Suitable carrier media may include signals such as electrical, electromagnetic, and/or other forms of analog and/or digital signals, conveyed via a communication medium such as one or more networks and/or on or more wireless links.

Figure 3:
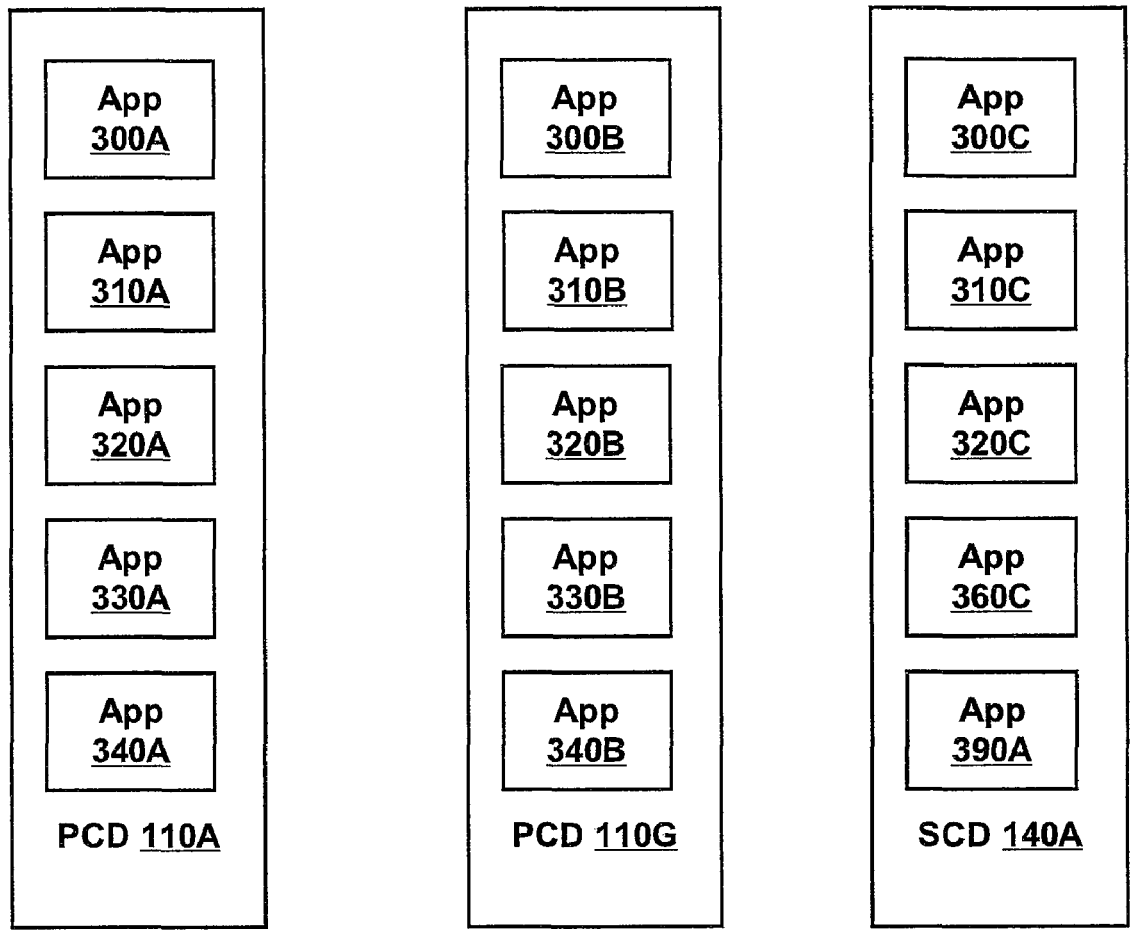
FIG. 3 is a block diagram of various applications that may be executed on various computing devices, according to various embodiments.
Figure 3:
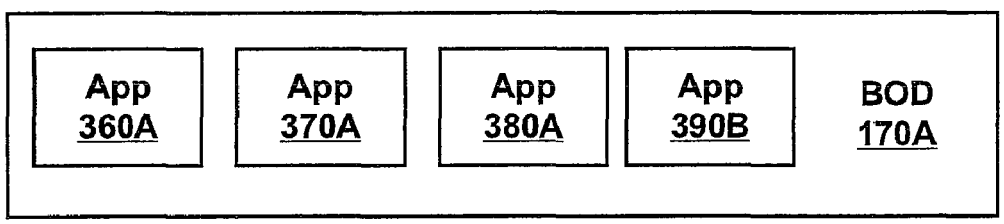
Figure 3:
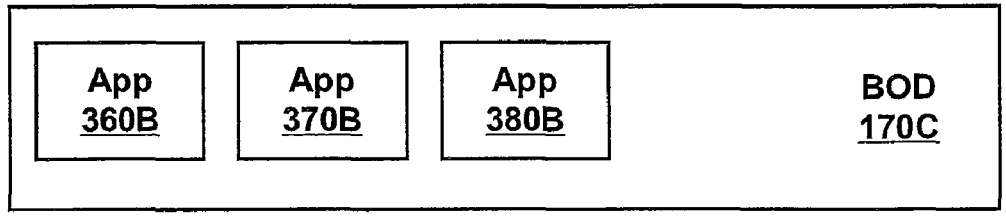

Turning now to FIG. 3, various applications that may be executed on various computing devices are illustrated, according to various embodiments. As shown, PCD 110A may include and/or execute applications 300A, 310A, 320A, 330A, and/or 350A; PCD 110G may include and/or execute applications 300B, 310B, 320B, 330B, and/or 350B; SCD 140A may include and/or execute applications 300C, 310C, 320C, 360C, and/or 390A; BOD 170A may include and/or execute applications 360A, 370A, 380A, and/or 390B; and/or BOD 170C may include and/or execute applications 360B, 370B, and/or 380B.

In various embodiments, application 300A may communicate with application 300B through network 130A, NMD 105, and network 130B. For example, each of applications 300A and 300B may be and/or include a peer-to-peer (p2p) application and an application protocol and/or application protocol signature may be associated with communication between applications 300A and 300B. In some embodiments, one or more of applications 310A and/or 310B may communicate with application 310C. For example, applications 310A and/or 310B may be client application and application 310C may be a server application, and an application protocol and/or an application protocol signature may be associated with communications between any two of the applications.

In some embodiments, applications 360A and/or 360B may communicate with application 360C. For example, applications 360A and/or 360B may be a client application and application 360C may be a server application, and an application protocol and/or an application protocol signature may be associated with communications between any two of the applications (e.g., applications 360A and 360B). For instance, applications 360A-360C may be used to conduct business. In one example, applications 360A-360B may authenticate payment information with application 360C. In another example, applications 360A-360B may place order information with application 360C.

In various embodiments, applications 300A-390B may communicate with one or more other applications, and communications to and/or from these applications may include an application protocol, an application protocol signature, an application signature, and/or some detectable and/or determinable pattern. These may be used to identify and/or classify the applications. For example, applications 330A and 340A may include BitTorrent and Kazaa, respectively, and these applications may be classified as "p2p" applications. In some embodiments, an application layer, e.g., OSI (Open Systems Interconnection) Layer 7, may be used to classify one or more applications. Table 1, below, illustrates some examples of applications and respective classifications.

TABLE 1

| Application: | Classification: |
|---|---|
| Quake, Doom, Half-life, among others | Game |
| AOL Instant Messenger, iChat, Yahoo Messenger, and/or MSN Messenger, among others | Messaging/Chat |

TABLE 1-continued

| Application: | Classification: |
|---|---|
| Biff, ccMail, Sendmail, Exim, LotusNotes, Exchange, and/or Outlook, among others | Email |
| Vonage and/or Skype, among others | VoIP |
| BitTorrent, Kazaa, eDonkey, Gnutella, and/or Napster, among others | p2p |
| Apache, Safari, Netscape, Internet Explorer, Mozilla, Firefox, among others | web |
| Oracle server, Oracle client, SQL server | database |
| iTunes, Quicktime, Windows Media Player, and/or YouTube, among others | audio/video |
| PCAnywhere, rlogin, telnet, VNC, and/or RemoteDesktop, among others | remote login |
| CCbill, and/or Multicard, among others | credit card billing |
| SQL Slammer, Ganda, Avron, ILOVEYOU, Code Red, and/or Nimda, among others | malware (e.g., worm, virus, Trojan horse, spyware, rootkit, etc.) |

Figure 4:
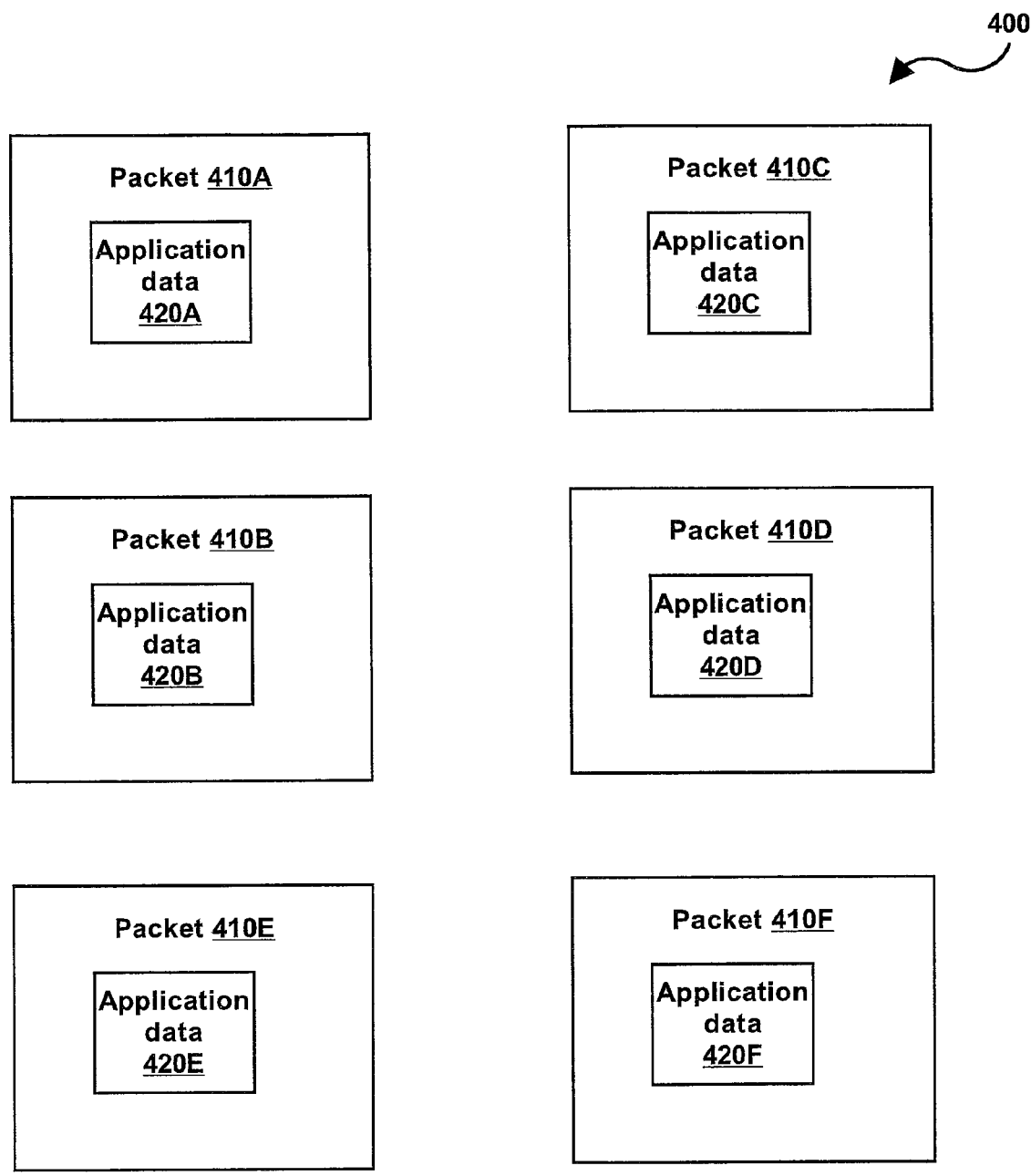
FIG. 4 is a block diagram of data, according to various embodiments.

Turning now to FIG. 4, data is illustrated, according to various embodiments. As shown, data 400 may include one or more packets 410A-410F. In various embodiments, each of packets 410A-410F may include each of respective application data 420A-420F, as illustrated. In some embodiments, packets 410A-410F may include one or more of an Internet protocol (IP) packet, a transmission control protocol (TCP) packet, a user datagram protocol (IDP) packet, and/or a packet as described in IEEE 802, among others.

Figure 5A:
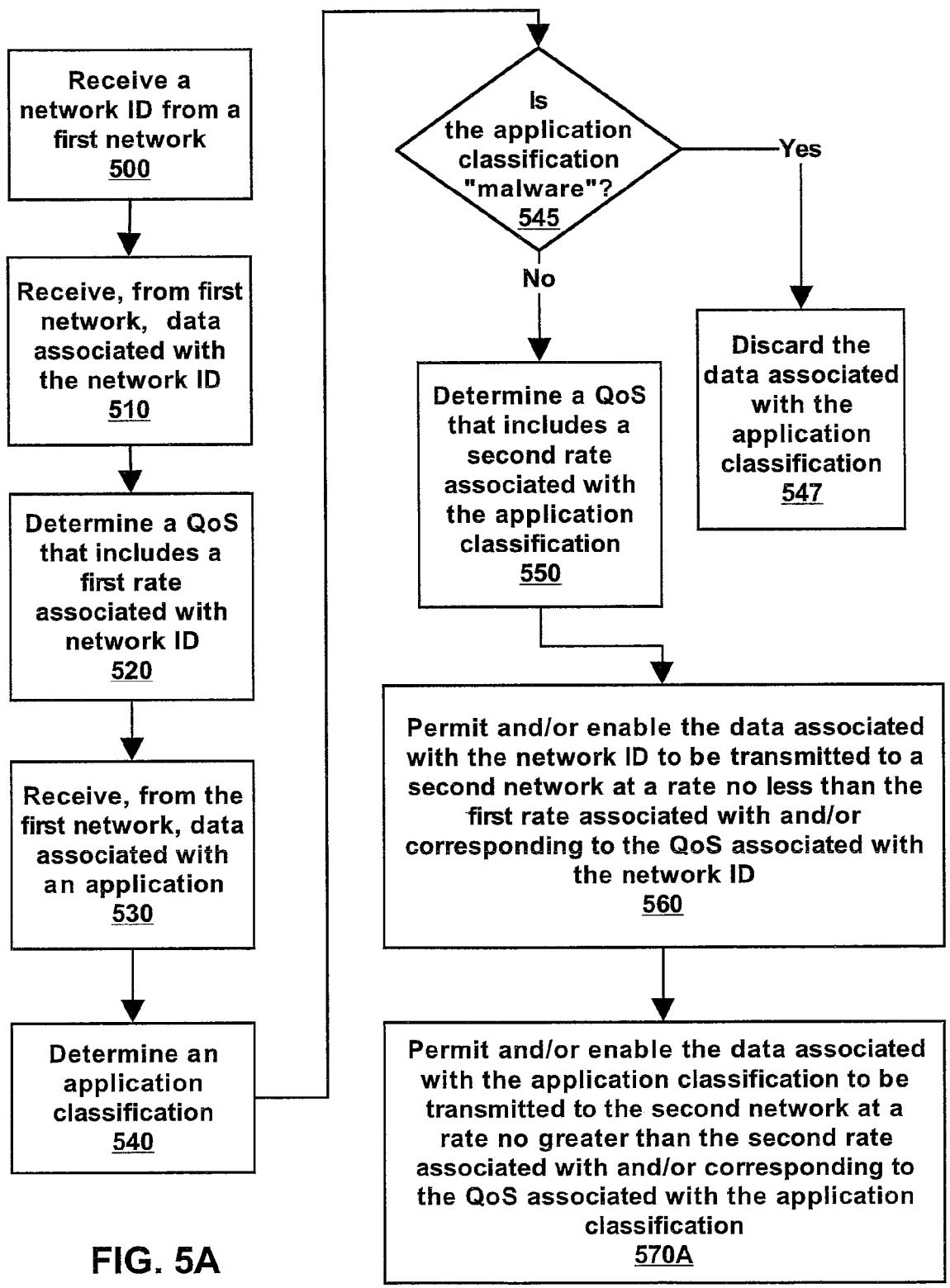
FIG. 5A illustrates a flowchart diagram of a method, according to various embodiments.

Turning now to FIG. 5A, a flowchart diagram of a method is illustrated, according to various embodiments. At 500, a network identification (ID) may be received from a network 130A. In various embodiments, the network ID may include one or more of access point identification information, a media access control (MAC) address, a service set identification information, a virtual local area network (VLAN) identification, a wireless communication channel identification, a physical port identification, and/or an Internet protocol (IP) address. In various embodiments, as used herein, a network ID may include an address and vice versa. For example, the network ID may include a MAC address of a PCD such as a MAC address of one of PCDs 110A-110F. In another example, the network ID may include a MAC address of an access point, such as one of APS 120A-120D. In some embodiments, the service set identification information may include one or more of an IEEE 802.11 service set identifier (SSID), an IEEE 802.11 extended service set identifier (ESSID), and/or an IEEE 802.11 basic service set identifier (BSSID). For example, one or more APs 120A-120B may use service set identification information in communicating with one or more computing devices. In some embodiments, one or more of APs 120A-120D may use various VLAN identifications. For example, AP 120B may associate service set identification information with one or more VLAN identifications. In another example, AP 120C may associate one or more physical ports with one or more VLAN identifications. For instance, each of PCDs 110D-110E may be coupled to a respective physical port of AP 120C, and those ports may be associated with one or more VLAN identifications.

In various embodiments, a mapping, stored in one or more memory mediums described herein, may include associations of identification information and network elements (e.g., access points, etc.) and/or computing devices. For example, the mapping may include various information illustrated in Table 2. For instance, identifications (e.g., MAC addresses, VLAN identifications, physical port identifications, and/or IP addresses, etc.) of PCDs 110A, BOD 170A, and/or RECDs 111A-111B may be associated and/or correspond with an identification (e.g., a MAC address, VLAN ID, and/or IP address, etc.) of AP 120D. In some embodiments, an access point, such as AP 120D, may include physical ports where computing devices and/or network elements may be coupled to the access point in a wired fashion. These physical ports may be enumerated according to some enumeration and one or more computing devices and/or network elements may be identified by a physical port to which it is coupled. In some embodiments, the mapping that includes a wireless AP may use service identification information (SID) as physical port information. For example, a SID may include one or more of an IEEE 802.11 service set identifier (SSID), an IEEE 802.11 extended service set identifier (ESSID), and/or an IEEE 802.11 basic service set identifier (BSSID), among others. In various embodiments, a wireless AP may be operable to concurrently support communicating using multiple SIDs.

ments, the QoS associated with the network ID may determine a class of service and/or be used to determine a class of service. In various embodiments, the QoS associated with the network ID may be used to prioritize data transfers and/or network traffic. For example, the QoS associated with the network ID may be different from another QoS. For instance, the QoS associated with the network ID may be a better and/or faster QoS than the other QoS, according to some metric, and/or the QoS associated with the network ID may be considered a higher priority than the other QoS. In one example, packets associated the other QoS may be dropped more often than packets associated with the QoS associated with the network ID. In another example, packets associated with the QoS associated with the network ID may be given greater bandwidth than packets associated with the other QoS. For instance, packets associated with the QoS associ-

TABLE 2

| Device | Device MAC Addr | Device IP Addr | AP | Physical Port | VLAN ID | AP MAC Addr | AP IP Addr |
|---|---|---|---|---|---|---|---|
| PCD 110A | 16:35:77:a3:f9 | 216.12.255.101 | AP 120D | 3 | 0 | 4f:ae:2b:45:11 | 216.12.255.100 |
| RECD 111A | 33:fa:49:a3:af | 216.12.255.109 | AP 120D | 5 | 4 | 4f:ae:2b:45:11 | 216.12.255.100 |
| RECD 111B | cd:33:88:ed:f4 | 216.12.255.77 | AP 120D | 6 | 4 | 4f:ae:2b:45:11 | 216.12.255.100 |
| BOD 170A | 22:35:2d:a6:a1 | 216.12.255.188 | AP 120D | 14 | 7 | 4f:ae:2b:45:11 | 216.12.255.100 |
| PCD 110B | 22:66:11:a6:a1 | 216.12.100.87 | AP 120B | SID A | 0 | 4f:ae:bb:45:cc | 216.12.100.5 |
| PCD 110C | 99:ef:33:a6:a1 | 216.12.100.85 | AP 120B | SID A | 0 | 4f:ae:bb:45:cc | 216.12.100.5 |
| RECD 110C | fa:ef:22:6e:a7 | 216.12.100.70 | AP 120B | SID B | 0 | 4f:ae:bb:45:cc | 216.12.100.5 |
| BOD 111C | ab:bf:33:6a:a2 | 216.12.100.80 | AP 120B | SID C | 7 | 4f:ae:bb:45:cc | 216.12.100.5 |
| PCD 110D | ad:ee:12:6a:10 | 216.12.100.50 | AP 120C | SID D | 0 | 5a:20:32:29:b1 | 216.12.100.6 |
| PCD 110E | 56:fb:14:f9:13 | 216.12.100.52 | AP 120C | SID E | 0 | 5a:20:32:29:b1 | 216.12.100.6 |
| PCD 110F | 4b:aa:2c:c4:b1 | 216.12.100.55 | AP 120C | SID D | 0 | 5a:20:32:29:b1 | 216.12.100.6 |

At 510, data associated and/or corresponding with the network ID may be received. In various embodiments, the data may include one or more packets (e.g., one or more of packets 410D-410F), and the one or more packets may include application data (e.g., one or more of application data 420D-420F) of an application (e.g., of an application listed in Table 1, an application of applications 300A-390B, etc.). In some embodiments, the network ID may be received in the one or more packets. In various embodiments, the network ID may be determined from the mapping. For example, packets 410D-410F may be received from PCD 110A and packets 410A-410C may be received from RECD 111A, and packets 410A-410F may be associated with the network ID which may include a network ID of AP 120D, since PCD 110A and RECD 111A may both be mapped to AP 120D. In some embodiments, packets may be associated and/or correspond with various network information (e.g., network element identifications, encapsulation, tunnels, etc.), through a mapping, such as the mapping described above.

Next at 520, a QoS associated with the network ID may be determined. The QoS associated with the network ID may include a transfer rate, and the transfer rate may include an upper limit and/or a lower limit. For example, an upper limit may include a maximum transfer rate of 256 kilo bits per second (kbps), and a lower limit may include a minimum transfer rate of 128 kbps, among others. In some embodiated with the network ID may be given a bandwidth of 256 kbps while packets associated with the other QoS may be given a bandwidth of 64 kbps. In some embodiments, the QoS associated with the network ID may include a minimum bandwidth. For example, the network ID may be associated with a back office device (e.g., one of BODs 170A-170C), and NCS 100 may be operated to and/or be configured to provide at least the minimum bandwidth to the back office device.

At 530, data associated with an application (e.g., a computer application of Table 1, among others) may be received. For example, the data associated with the application may include packets 410A-410C which may be received from a computing device coupled to network 130A. In various embodiments, packets 410A-410C may include application data 420A-420C. In some embodiments, the application may include one of applications 300B-340B.

After receiving the data associated with the application, an application classification may be determined at 540. In various embodiments, one or more of application data 420A-420C may be analyzed to determine the application classification. In a first example, a pattern of the data associated with the application may be determined and may be used to determine the application classification. In a second example, a regular expression may be used to determine the application classification. For instance, a regular expression such as "*HTTP/1.1*Content-type:*text/html*" (where "*" may be used as a wildcard) may be used to determine an application classification of "web" for the application classification.

In some embodiments, an application protocol may be determined and may be used to determine the application classification. In various examples, various protocols may be detected and/or determined from the data associated with the application. One or more application protocols may include simple mail transfer protocol (SMTP), file transfer protocol (FTP), hypertext transfer protocol (HTTP), secure HTTP (https), Internet printer protocol (IPP), Internet message access protocol (IMAP), network time protocol (NTP), post office protocol (POP), and/or simple network management protocol (SNMP), among others. In one example, it may be determined that the data associated with the application includes the simple mail transfer protocol, and the application classification may be determined to be "email". In a second example, it may be determined that the data associated with the application includes the hypertext transfer protocol, and the application classification may be determined to be "web".

In various embodiments, a file protocol and/or a streaming protocol may be determined and may be used to determine the application classification. In some embodiments, an image file protocol and/or format may be detected and/or determine as a file protocol and/or streaming protocol. For example, the data associated with the application may include a file protocol and/or format according to JPEG (joint photographic experts group), PNG (portable network graphics), and/or GIF (graphics interchange format), among others. In various embodiments, a motion picture file protocol and/or streaming protocol may be determined and may be used to determine the application classification. For example, one or more of a moving picture experts group (MPEG) file protocol and/or streaming protocol may be detected and/or determined from the data associated with the application, and the application classification may be determined to be "audio/video".

In some embodiments, an application protocol signature may be determined and may be used to determine the application classification. For example, a checksum and/or hash value may be determined using at least a portion of the data associated with the application. The checksum and/or hash value may be used as an application protocol signature. In another example, a pattern of at least a portion of the data associated with the application may be detected and/or determined and may be used to determine the application classification. For instance, one or more of a neural network, a Bayesian indicator, and/or a learning vector quantization system may be used to detect and/or determine a pattern and/or an application protocol signature. In various embodiments, determining the application protocol signature may include using and/or accessing one or more of HPCs 180A-180B.

At 545, it may be determined if the application classification is "malware". If so, the method may proceed to 547 where the data associated with the application may be discarded. If not, the method may proceed to 550.

At 550, a QoS associated with the application classification may be determined. The QoS associated with the application classification may include a transfer rate, and the transfer rate may include an upper limit and/or a lower limit. For example, an upper limit may include a maximum transfer rate of 512 kbps, and a lower limit may include a minimum transfer rate of 256 kbps, among others. In some embodiments, the QoS associated with the application classification may determine a class of service and/or be used to determine a class of service. In various embodiments, the QoS associated with the application classification may be used to prioritize data transfers and/or network traffic.

At 560, the data associated with the network ID may be permitted and/or enabled to be transmitted to network 130B. In some embodiments, various attributes and/or metrics associated with the QoS associated with the network ID may be used to transmit the data associated with the network ID to network 130B. For example, the QoS associated with the network ID may include a minimum bandwidth and/or network capacity (e.g., 256 kbps), and the data associated with the network ID may be permitted and/or enabled to be transmitted to network 130B at a rate no less than the minimum bandwidth (e.g., 256 kbps). In other words, there can be the minimum bandwidth (e.g., 256 kbps) and/or capacity available for the data associated with the network ID to be transmitted to network 130B regardless of other network traffic associated with network 130A, in various embodiments. For example, data from one or more of PCDs 110D-110E may be permitted and/or enabled to be transmitted at least at the minimum bandwidth and/or capacity regardless of other network traffic, since PCDs 110D-110E can be associated with a same network ID as shown in the mapping above. In another example, data from BODs 170A and 170C may be permitted and/or enabled to be transmitted at least at the minimum bandwidth regardless of other network traffic, since BODs 170A and 170C can be associated with a same network ID of same VLAN identification information as shown in the mapping above. In various embodiments, permitting and/or enabling one or more back office devices a minimum available bandwidth may help a entity conduct business more efficiently and/or at an estimated and/or predicable efficiency and/or rate, since network capacity can be available for the one or more back office devices regardless of other network traffic.

At 570, the data associated with the application classification may be permitted and/or enabled to be transmitted to network 130B. In some embodiments, various attributes and/or metrics associated with the QoS associated with the application classification may be used to transmit the data associated with the application classification to network 130B. In various embodiments, the data associated with the application classification may be enabled and/or permitted to be transmitted to network 130B at a rate no greater than the upper limit of the QoS associated with the application classification.

For example, the QoS associated with the application classification may include a maximum bandwidth and/or network capacity (e.g., 512 kbps), and the data associated with the application classification may be permitted and/or enabled to be transmitted to network 130B at a rate no greater than the maximum bandwidth (e.g., 512 kbps). In other words, there can be the bandwidth upper-limit and/or maximum capacity (e.g., 512 kbps) available for the data associated with the application classification to be transmitted to network 130B, in various embodiments. For example, the determined application classification may include "p2p", and data from applications classified as "p2p" (e.g., BitTorrent, Kazaa, eDonkey, Gnutella, and/or Napster, among others) may be permitted and/or enabled to be transmitted to network 130A at a rate no greater than the maximum bandwidth and/or network capacity (e.g., 512 kbps) of the QoS associated with the application classification.

Figure 5B:
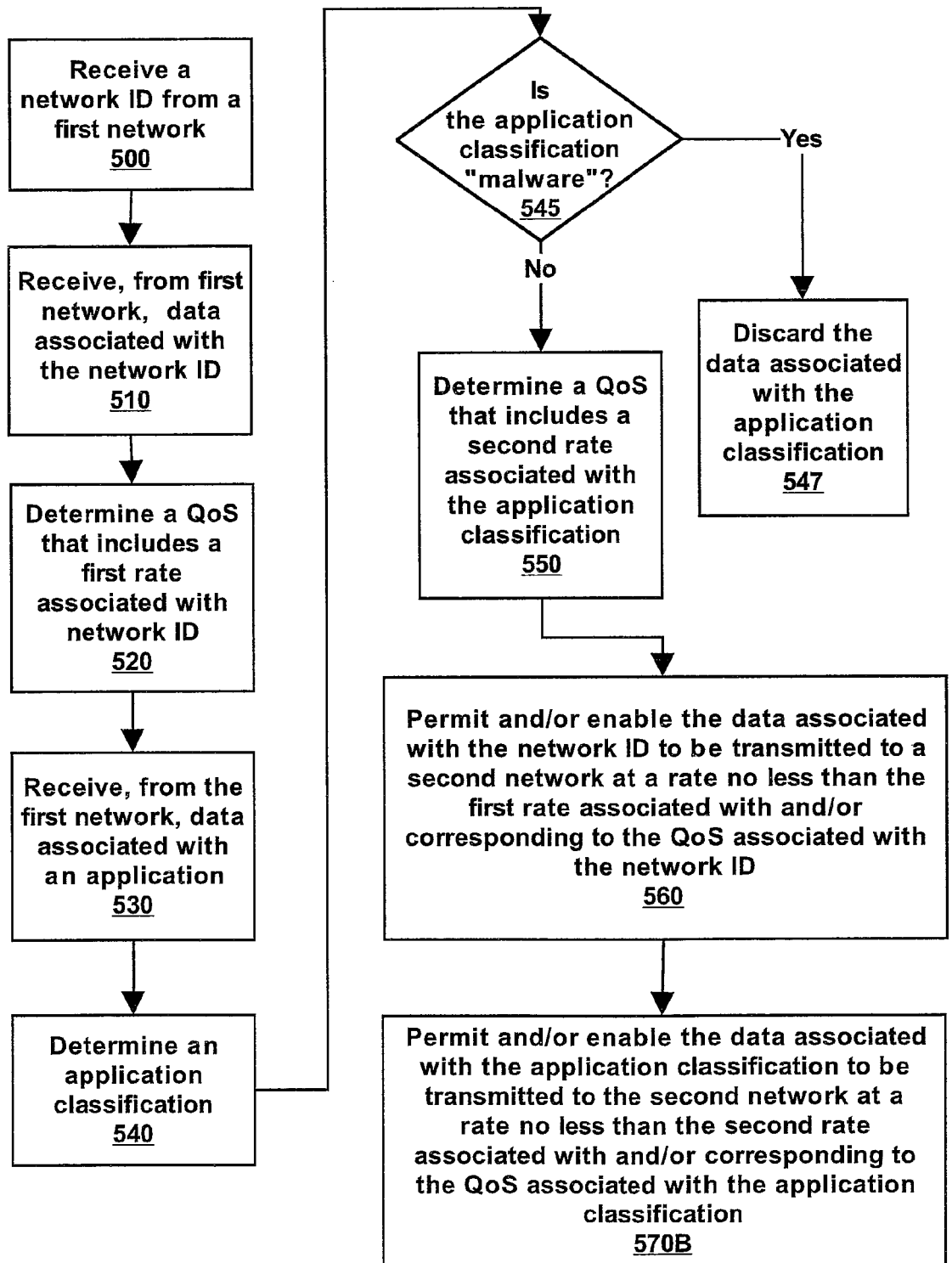
FIG. 5B illustrates a flowchart diagram of a method, according to various embodiments.

Turning now to FIG. 5B, a flowchart diagram of a method is illustrated, according to various embodiments. Elements 500-560 of FIG. 5B are described above with reference to FIG. 5A. As shown at 570B, the data associated with the application classification may be permitted and/or enabled to be transmitted to network 130B. In some embodiments, the data associated with the application classification may be permitted and/or enabled to be transmitted to network 130B at a rate no less than the minimum bandwidth (e.g., 256 kbps). In other words, there will be the minimum bandwidth (e.g., 256 kbps) and/or capacity available for the data associated with the application classification to be transmitted to network 130B regardless of other network traffic associated with network 130A, in various embodiments. For example, the QoS associated with the application classification may include a minimum bandwidth and/or network capacity (e.g., 256 kbps), and the data associated with the application classification may be permitted and/or enabled to be transmitted to network 130B at a rate no less than the minimum bandwidth (e.g., 256 kbps). In other words, there can be the minimum bandwidth and/or capacity (e.g., 256 kbps) available for the data associated with the application classification to be transmitted to network 130B regardless of other network traffic associated with network 130A, in various embodiments. For example, the application classification may include "credit card billing", and data from one or more applications (e.g., applications 360A-380A, 390B, 360B-380B, etc.) that are included in the application classification may be permitted and/or enabled to be transmitted at no less than the minimum bandwidth regardless of other network traffic. In various embodiments, permitting and/or enabling one or more applications of back office devices a minimum available bandwidth may help an entity conduct business more efficiently and/or at an estimated and/or predicable efficiency and/or rate, since network capacity can be available for the one or more applications, such as for one or more applications running on one or more back office devices, regardless of other network traffic.

Figure 6A:
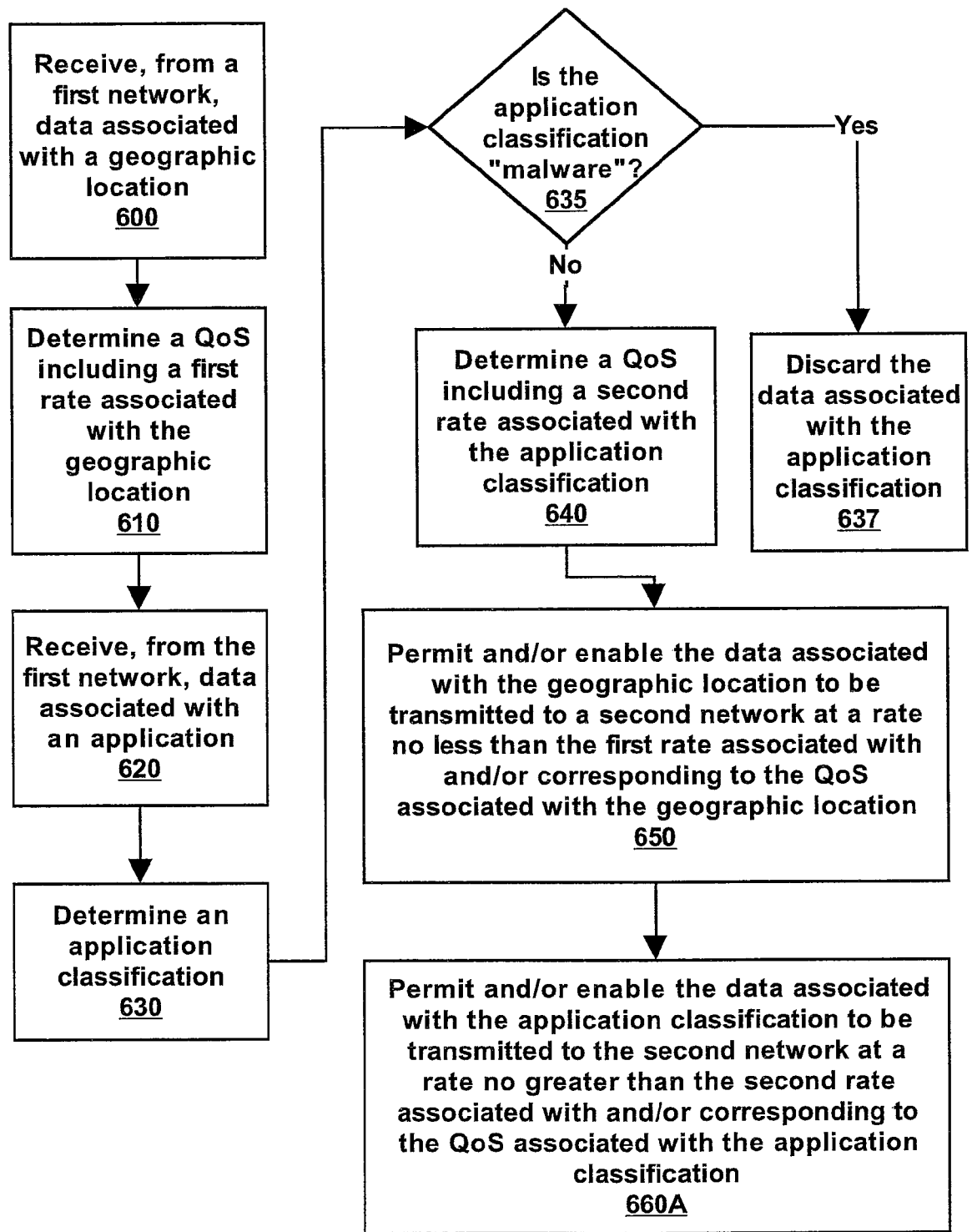
FIG. 6A illustrates a flowchart diagram of a method, according to various embodiments.

Turning now to FIG. 6A, a flowchart that depicts a method is illustrated, according to various embodiments. As shown, at 600, data from network 130A may be received, and the data may be associated with a geographic location (e.g., one of locations 175A-174C). In various embodiments, the data may include one or more packets (e.g., one or more of packets 410D-410F), and the one or more packets may include application data (e.g., one or more of application data 420D-420F) of an application (e.g., of an application listed in Table 1, an application of applications 300A-390B, etc.).

In some embodiments, the geographic location may be provided by a computing device (e.g., one of PCDs 110A-110E, BOD 170C, RECDs 111A-111C), determined by a known geographic location of an access point (e.g., APs 120A-120D), and/or determined from known geographic locations of where a computing device may couple to a network. For example, location 175C may include a meeting room and a physical access port in the meeting room may be coupled to a physical port of AP 120C. For instance, PCD 110D may couple to the physical access port in the meeting room and, thus, it may be determined that PCD 110D is at or within location 175C, since PCD 110D is coupled to a physical port of AP 120C. In a second example, AP 120B may provide network access to geographic location 175B, and computing devices communicating with AP 120B may considered to be at and/or within location 175B. In another example, a computing device may provide geographic location information. For instance, the computing device may provide latitude and/or longitude information that may be used to determine a location of the computing device.

Next at 610, a QoS associated with the geographic location may be determined. The QoS associated with the geographic location may include a transfer rate, and the transfer rate may include an upper limit and/or a lower limit. For example, an upper limit may include a maximum transfer rate of 256 kilo bits per second (kbps), and a lower limit may include a minimum transfer rate of 128 kbps, among others. In some embodiments, the QoS associated with the geographic location may determine a class of service and/or be used to determine a class of service. In various embodiments, the QoS associated with the geographic location may be used to prioritize data transfers and/or network traffic. For example, the QoS associated with the geographic location may be different from another QoS. For instance, the QoS associated with the geographic location may be a better and/or faster QoS than the other QoS, according to some metric, and the QoS associated with the geographic location may be considered a higher priority than the other QoS. In one example, packets associated the other QoS may be dropped more often than packets associated with the QoS associated with the geographic location. In another example, packets associated with the QoS associated with the geographic location may be given greater bandwidth than packets associated with the other QoS. For instance, packets associated with the QoS associated with the geographic location may be given a bandwidth of 256 kbps while packets associated with the other QoS may be given a bandwidth of 64 kbps. In some embodiments, the QoS associated with the geographic location may include a minimum bandwidth. For example, the geographic location may be location 175B and include BOD 170C, and NCS 100 may be operated to and/or be configured to provide at least the minimum bandwidth to the BOD 170C.

At 620, data associated with an application (e.g., a computer application of Table 1, among others) may be received. For example, the data associated with the application may include packets 410A-410C which may be received from a computing device coupled to network 130A. In various embodiments, packets 410A-410C may include application data 420A-420C. In some embodiments, the application may include one of applications 300B-340B.

After receiving the data associated with the application, an application classification may be determined at 630. In various embodiments, one or more of application data 420A-420C may be analyzed to determine the application classification. In a first example, a pattern of the data associated with the application may be determined and may be used to determine the application classification. In a second example, a regular expression may be used to may be used to determine the application classification. For instance, a regular expression such as "*HTTP/1.1*Content-type:*text/html*" (where "*" may be used as a wildcard) may be used to determine an application classification of "web" for the application classification.

In some embodiments, an application protocol may be determined and may be used to determine the application classification. In various examples, various protocols may be detected and/or determined from the data associated with the application. One or more application protocols may include simple mail transfer protocol (SMTP), file transfer protocol (FTP), hypertext transfer protocol (HTTP), secure HTTP (https), Internet printer protocol (IPP), Internet message access protocol (IMAP), network time protocol (NTP), post office protocol (POP), and/or simple network management protocol (SNMP), among others. In one example, it may be determined that the data associated with the application includes the simple mail transfer protocol, and the application classification may be determined to be "email". In a second example, it may be determined that the data associated with the application includes the hypertext transfer protocol, and the application classification may be determined to be "web".

In various embodiments, a file protocol and/or a streaming protocol may be determined and may be used to determine the application classification. In some embodiments, an image file protocol and/or format may be detected and/or determine as a file protocol and/or streaming protocol. For example, the data associated with the application may include a file protocol and/or format according to JPEG (joint photographic experts group), PNG (portable network graphics), and/or GIF (graphics interchange format), among others. In various embodiments, a motion picture file protocol and/or streaming protocol may be determined and may be used to determine the application classification. For example, one or more of a moving picture experts group (MPEG) file protocol and/or streaming protocol may be detected and/or determined from the data associated with the application, and the application classification may be determined to be "audio/video".

In some embodiments, an application protocol signature may be determined and may be used to determine the application classification. For example, a checksum and/or hash value may be determined using at least a portion of the data associated with the application. The checksum and/or hash value may be used as an application protocol signature. In another example, a pattern of at least a portion of the data associated with the application may be detected and/or determined and may be used to determine the application classification. For instance, one or more of a neural network, a Bayesian indicator, and/or a learning vector quantization system may be used to detect and/or determine a pattern and/or an application protocol signature. In various embodiments, determining the application protocol signature may include using and/or accessing one or more of HPC 180A-180B.

At 635, it may be determined if the application classification is "malware". If so, the method may proceed to 637 where the data associated with the application may be discarded. If not, the method may proceed to 640.

At 640, a QoS associated with the application classification may be determined. The QoS associated with the application classification may include a transfer rate, and the transfer rate may include an upper limit and/or a lower limit. For example, an upper limit may include a maximum transfer rate of 512 kbps, and a lower limit may include a minimum transfer rate of 256 kbps, among others. In some embodiments, the QoS associated with the application classification may determine a class of service and/or be used to determine a class of service. In various embodiments, the QoS associated with the application classification may be used to prioritize data transfers and/or network traffic.

At 650, the data associated with the geographic location may be permitted and/or enabled to be transmitted to network 130B. In some embodiments, various attributes and/or metrics associated with the QoS associated with the geographic location may be used to transmit the data associated with the geographic location to network 130B. For example, the QoS associated with the geographic location may include a minimum bandwidth and/or network capacity (e.g., 256 kbps), and the data associated with the geographic location may be permitted and/or enabled to be transmitted to network 130B at a rate no less than the minimum bandwidth (e.g., 256 kbps). In other words, there can be the minimum bandwidth (e.g., 256 kbps) and/or capacity available for the data associated with the geographic location to be transmitted to network 130B regardless of other network traffic associated with network 130A, in various embodiments. For example, data from one or more of PCDs 110D-110E may be permitted and/or enabled to be transmitted at least at the minimum bandwidth and/or capacity regardless of other network traffic, since PCDs 110D-110E can be associated with a same geographic location.

At 660A, the data associated with the application classification may be permitted and/or enabled to be transmitted to network 130B. In some embodiments, various attributes and/or metrics associated with the QoS associated with the application classification may be used to transmit the data associated with the application classification to network 130B. In various embodiments, the data associated with the application classification may be enabled and/or permitted to be transmitted to network 130B at a rate no greater than the upper limit of the QoS associated with the application classification.

For example, the QoS associated with the application classification may include a maximum bandwidth and/or network capacity (e.g., 512 kbps), and the data associated with the application classification may be permitted and/or enabled to be transmitted to network 130B at a rate no greater than the maximum bandwidth (e.g., 512 kbps). In other words, there can be the bandwidth upper-limit and/or maximum capacity (e.g., 512 kbps) available for the data associated with the application classification to be transmitted to network 130B, in various embodiments. For example, the determined application classification may include "p2p", and data from applications classified as "p2p" (e.g., BitTorrent, Kazaa, eDonkey, Gnutella, and/or Napster, among others) may be permitted and/or enabled to be transmitted to network 130A at a rate no greater than the maximum bandwidth and/or network capacity (e.g., 512 kbps) of the QoS associated with the application classification.

Figure 6B:
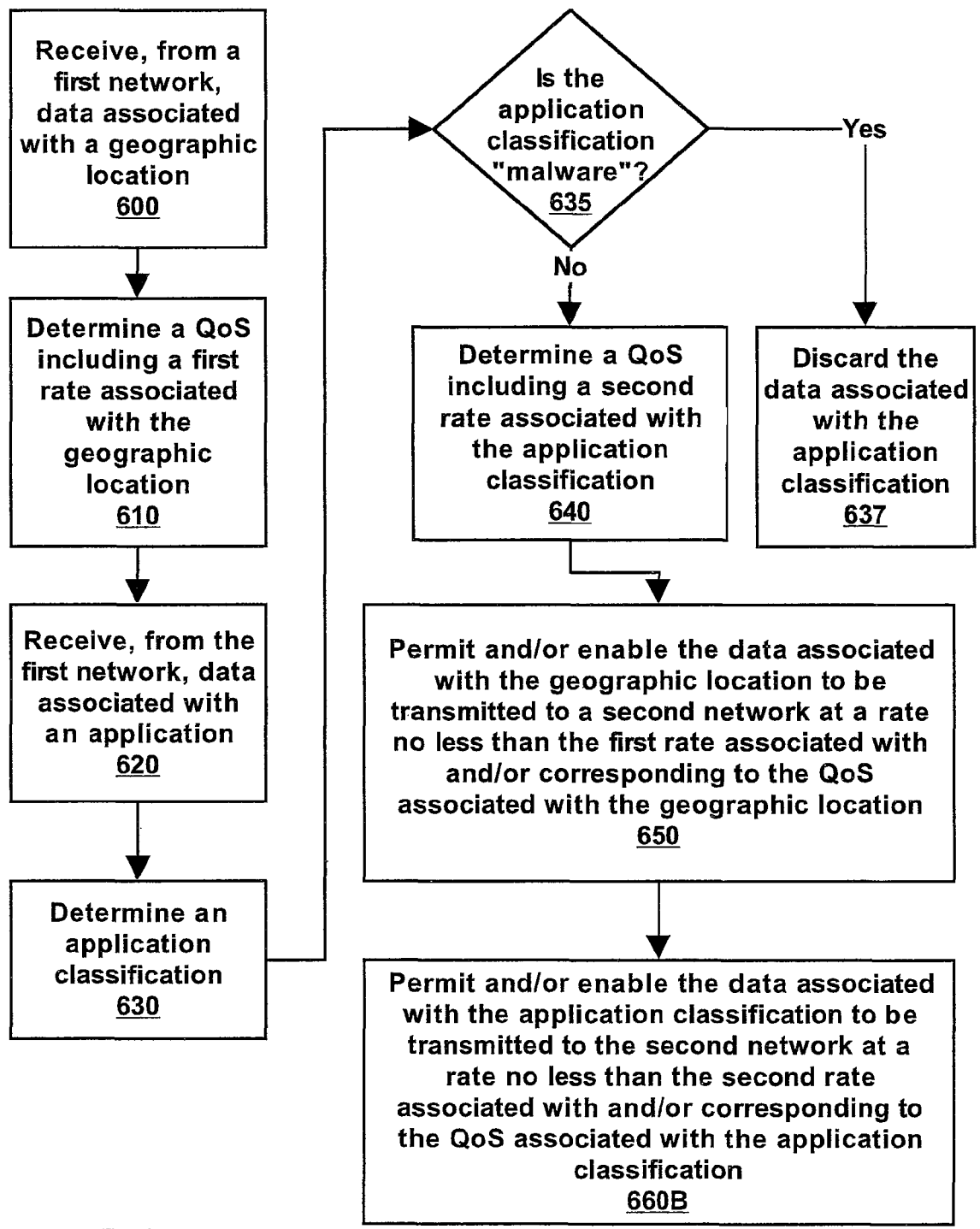
FIG. 6B illustrates a flowchart diagram of a method, according to various embodiments.

Turning now to FIG. 6B, a flowchart diagram of a method is illustrated, according to various embodiments. Elements 600-650 of FIG. 6B are described above with reference to FIG. 6A. As shown at 660B, the data associated with the application classification may be permitted and/or enabled to be transmitted to network 130B. In some embodiments, the data associated with the application classification may be permitted and/or enabled to be transmitted to network 130B at a rate no less than the minimum bandwidth (e.g., 256 kbps). In other words, there will be the minimum bandwidth (e.g., 256 kbps) and/or capacity available for the data associated with the application classification to be transmitted to network 130B regardless of other network traffic associated with network 130A, in various embodiments. For example, the QoS associated with the application classification may include a minimum bandwidth and/or network capacity (e.g., 256 kbps), and the data associated with the application classification may be permitted and/or enabled to be transmitted to network 130B at a rate no less than the minimum bandwidth (e.g., 256 kbps). In other words, there can be the minimum bandwidth and/or capacity (e.g., 256 kbps) available for the data associated with the application classification to be transmitted to network 130B regardless of other network traffic associated with network 130A, in various embodiments. For example, the application classification may include "credit card billing", and data from one or more applications (e.g., applications 360A-380A, 390B, 360B-380B, etc.) that are included in the application classification may be permitted and/or enabled to be transmitted at least at the minimum bandwidth regardless of other network traffic. In various embodiments, permitting and/or enabling one or more applications of back office devices a minimum available bandwidth may help a entity conduct business more efficiently and/or at an estimated and/or predicable efficiency and/or rate, since network capacity can be available for the one or more applications, such as for one or more applications running on one or more back office devices, regardless of other network traffic.

Figure 7:
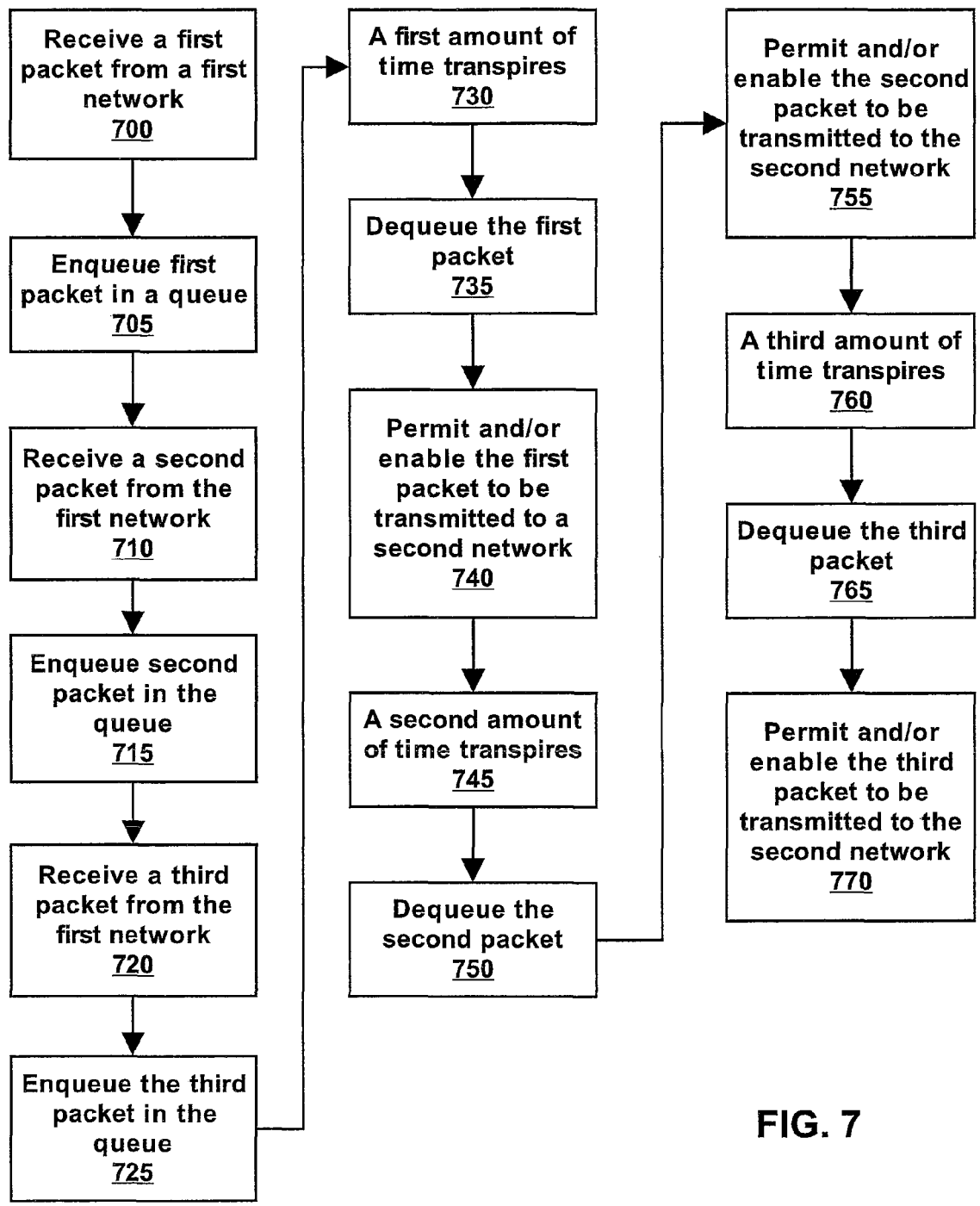
FIG. 7 illustrates a flowchart diagram of a method that may be used in providing various qualities of services, according to various embodiments.

Turning now to FIG. 7, a flowchart is illustrated that depicts a method that may be used in providing various qualities of services, according to various embodiments. As shown, a first packet may be received from a first network, at 700. The first network may include network 130A or network 130B. Next at 705, the first packet may be enqueued into a queue. At 710, a second packet may be received from the first network, and then at 715, the second packet may be enqueued into the queue. Next at 720, a third packet may be received from the first network, and then at 725, the third packet may be enqueued in the queue.

In various embodiments, a QoS may include and/or be associated with various attributes that may determine data flow and/or transfer rates, and these attributes determining permitted and/or enabled transmission may be based on those attributes. For example, the QoS may be used to determine a first amount of time to transpire before permitting and/or enabling a packet to be transmitted to a second network. The second network may include network 130A or network 130B. For instance, if the first network includes network 130A, then the second network includes network 130B, and if the first network includes network 130B, then the second network includes network 130A.

At 730, the first amount of time may transpire. Next at 735, the first packet may be dequeued, and at 740, the first packet may be permitted and/or enabled to be transmitted to the second network. Next at 750, a second amount of time may transpire. The second amount of time may be the same as the first amount of time, or the second amount of time may be different than the first amount of time. In some embodiments, a determination of the second amount of time may be based on the QoS and/or traffic conditions of the first network and/or the second network. Next at 755, the second packet may be permitted and/or enabled to be transmitted to the second network. At 760, a third amount of time may transpire. The third amount of time may be the same as the first amount of time and/or the second amount of time, or the third amount of time may be different than the first amount of time and/or the second amount of time. In some embodiments, a determination of the third amount of time may be based on the QoS and/or traffic conditions of the first network and/or the second network. Next at 765, the third packet may be dequeued, and at 770, the third packet may be permitted and/or enabled to be transmitted to the second network. In some embodiments, the method and/or portions of the method may repeat.

In various embodiments, the queue may include a priority queue. For example, the packets may be associated with various priorities, and each of the packets may be dequeued based on its priority. Moreover, the amounts of time transpiring may be based on each packet's priority in the priority queue. Accordingly, various of the method elements may be executed in various orders according to various priorities and/or various qualities of services.

Figure 8:
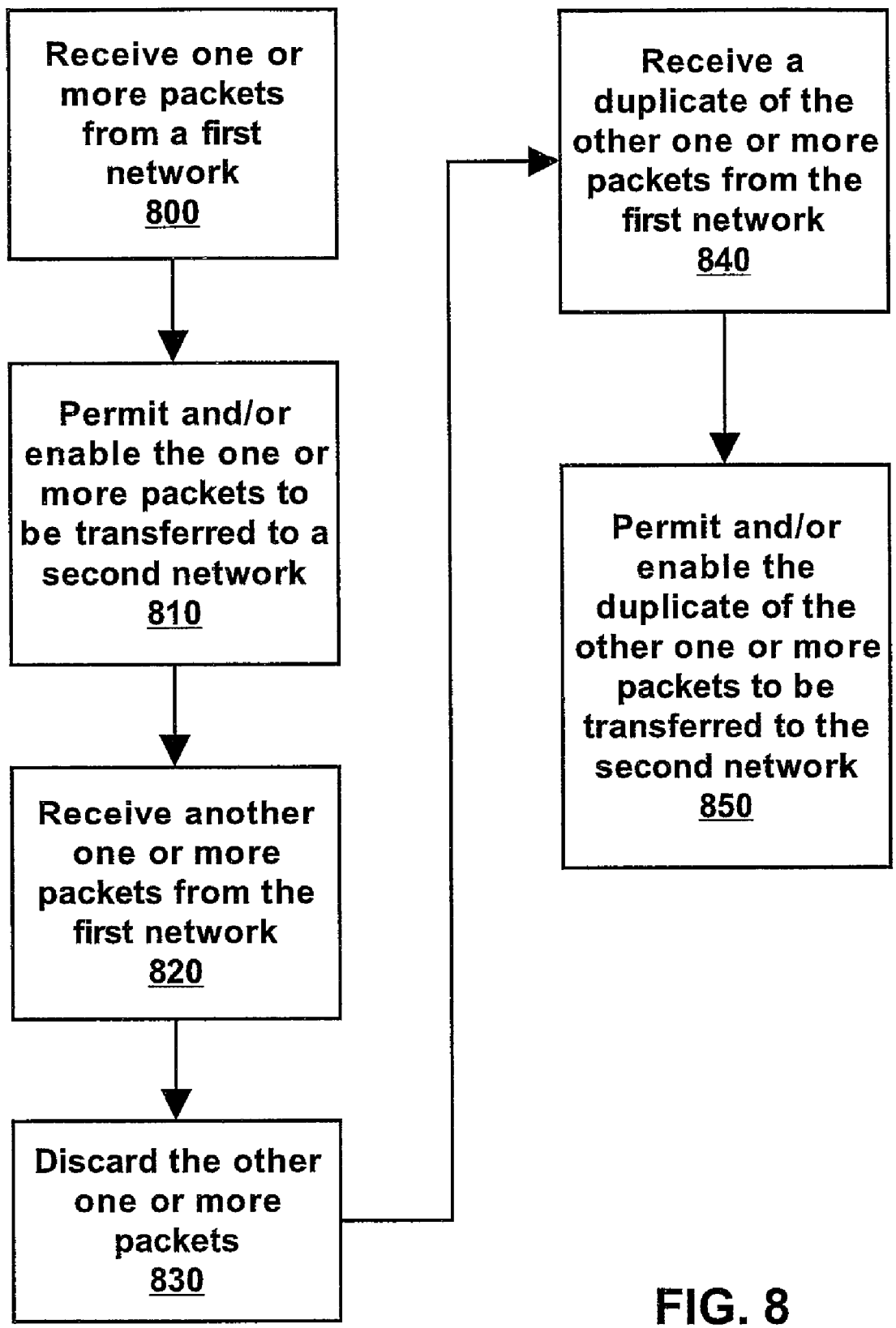
FIG. 8 illustrates a flowchart diagram of a method that may be used in providing various qualities of services, according to various embodiments.

Turning now to FIG. 8, a flowchart is illustrated that depicts a method that may be used in providing various qualities of services, according to various embodiments. At 800, one or more packets may be received from a first network. The first network may include network 130A or network 130B. Next at 810, the one or more packets may be permitted and/or enabled to be transmitted to a second network. The second network may include network 130A or network 130B. For instance, if the first network includes network 130A, then the second network includes network 130B, and if the first network includes network 130B, then the second network includes network 130A. At 820, another one or more packets may be received from the first network, and then at 830, the other one or more packets may be discarded. In some embodiments, conducting communications in accordance and/or association with a QoS may include discarding one or more packets. Next at 840, a duplicate of the other one or more packets may be received from the first network, and then at 850, the duplicate of the other one or more packets may be permitted and/or enabled to be transmitted to the second network. In various embodiments, the method and/or portions of the method may repeat.

Figures 9, 10:
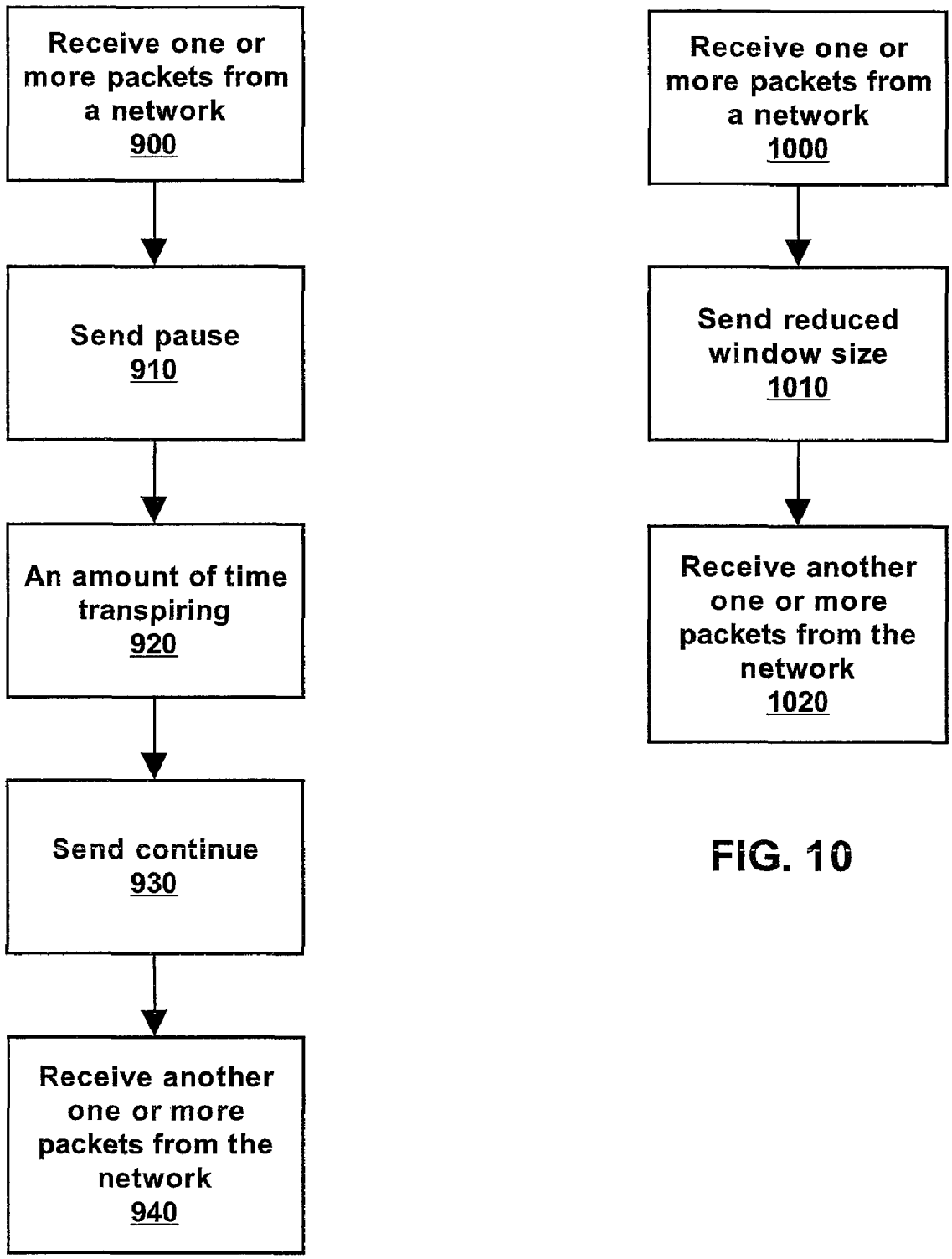
FIG. 9 illustrates a flowchart diagram of a method that may be used in providing various qualities of services, according to various embodiments.
FIG. 10 illustrates a flowchart diagram of a method that may be used in providing various qualities of services, according to various embodiments.

Turning now to FIG. 9, a flowchart is illustrated that depicts a method that may be used in providing various qualities of services, according to various embodiments. At 900, one or more packets may be received from a network. The network may include network 130A or network 130B. In various embodiments, the one or more packets may be associated with a network ID. Next at 910, a pause message and/or command may be sent to the network ID. In some embodiments, sending the pause message and/or command may include sending a zero window size. For example, the zero window size may be included in an acknowledgement. At 920, an amount of time may transpire. In various embodiments, a QoS may include and/or be associated with various attributes that may determine data flow and/or transfer rates, and these attributes determining permitted and/or enabled transmission may be based on those attributes. For example, the QoS may be used to determine the amount of time to transpire before sending a continue message and/or command to the network ID, at 930. In some embodiments, the continue message and/or command may include a non-zero window size. For instance, the non-zero window size may be included in an acknowledgement. Next at 940, another one or more packets from the network may be received. In various embodiments, the method and/or portions of the method may repeat.

Turning now to FIG. 10, a flowchart is illustrated that depicts a method that may be used in providing various qualities of services, according to various embodiments. At 1000, one or more packets may be received from a network. The network may include network 130A or network 130B. In various embodiments, the one or more packets may be associated with a network ID. In some embodiments, the one or more packets may include and/or be associated with a window size. For example, the window size may indicate an amount of application data that may be communicated. In various embodiments, a QoS may include and/or be associated with various attributes that may determine data flow and/or transfer rates, and these attributes determining permitted and/or enabled transmission may be based on those attributes. For example, the QoS may be used to determine a reduced window size. At 1010, the reduced window size may be sent to the network ID. For instance, the reduced window size may be sent may be included in an acknowledgement. Next at 1020, another one or more packets from the network may be received.

Turning now to FIG. 11, a flowchart diagram of a method is illustrated, according to various embodiments. At 1100, data associated with an application (e.g., a computer application of Table 1, among others) may be received. For example, the data associated with the application may include packets 410A-410C. In various embodiments, packets 410A-410C may include application data 420A-420C. In some embodiments, an application classification may be determined using various methods and/or systems described herein, and at 1110, it may be determined that the application classification is "malware". Next at 1120, the malware application data may be discarded.

Turning now to FIG. 12, a flowchart diagram of a method is illustrated, according to various embodiments. As shown, input may be received at 1200. In some embodiments, the input may be from a user of a computing device (e.g., one of PCDs 110A-110F and RECDs 111A-111C). For example, NCS 100 may be configured to provide the computing device with a first QoS. For instance, the first QoS may include a maximum communication transfer rate. The maximum communication transfer rate may include a transmission rate of 128 kbps for transmitting data and/or a reception rate of 256 kbps for receiving data.

In various embodiments, the input may be from an operator (e.g., an operator of NCS 100) of a computing device (e.g., one of PCDs 110A-110H, RECDs 111A-110C, BODs 170A-170C, and SCDs 140A-140C).

In some embodiments, the input may include a request for a second QoS. In some embodiments, one or more requests for different and/or alternate qualities of services may include authentication and/or authorization information. For example, the authentication and/or authorization information may include one or more of compensation information, credit card information, prepaid card information, username and password information, acceptance information, coupon information, network identification information, and/or access code information, among others.

Next at 1210, it may be determined that the input is accepted. In one example, the user may provide credit card information, and it may be determined that compensation may be obtained from the provided credit card information. In a second example, the user may provide acceptance information (e.g., clicking on an "ok" or "accept" button on a web page), and the user's hotel room number may be billed. In another example, the operator may use username and password information, and the username and password information may be authenticated with an authentication and/or authorization device (e.g., a server); however, username and password information is not limited only to operators.

Next at 1220, quality of service may be adjusted. For example, in the case of the user, the computing device using the first QoS may be provided the second QoS. In another example, in the case of the operator, the second QoS may be provided to one or more computing devices coupled to an access point (e.g., one or more of PCDs 110D-110F coupled to AP 120C) and/or to one or more computing devices in a geographic location (e.g., one or more of PCDs 110C-110D, BOD 170C, and RECD 111C in location 175B).

In various embodiments, various qualities of service associated with the method illustrated, in FIG. 12, may be based on application classification. For example, the user may increase quality of service for a VoIP application (e.g., Vonage, Skype, etc.). In another example, the operator may increase quality of service for one or more video applications. For instance, AP 120C may provide network services to a meeting room, and a meeting may use the one or more video applications.

In some embodiments, quality of service may be adjusted to a lesser quality of service. For example, the user may adjust to a lesser quality of service after using the VoIP application. In another example, the operator may adjust all computing devices coupled to AP 120C to a lesser quality of service.

In various embodiments, a better quality of service (e.g., the second QoS) may be adjusted after a time in the future. For example, the user may reserve a minimum amount of bandwidth for an application to be used after the time in the future. For instance, the user may be traveling to a hotel and reserve bandwidth for the VoIP application. In another example, the operator may reserve bandwidth for a meeting that is to transpire in the future. For instance, the operator may reserve bandwidth for all computing devices coupled to AP 120C and using video application data.

Figure 13:
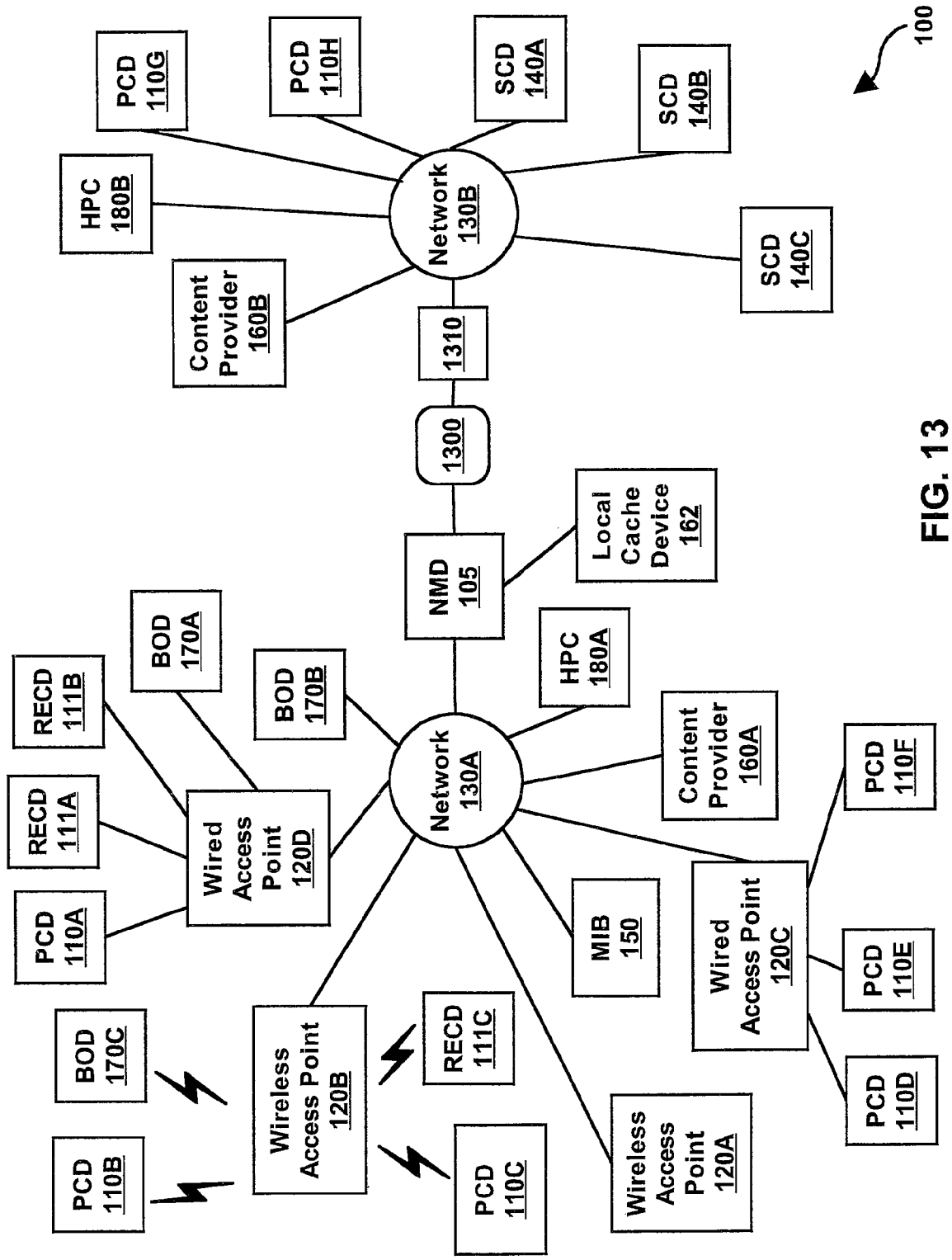
FIG. 13 is a block diagram of a network communication system, according to various embodiments.

Turning now to FIG. 13, NCS 100 is illustrated, according to various embodiments. As shown, NCS 100 may include a link 1300 coupled to a computing device 1310 and coupled to NMD 105. In various embodiments, link 1300 and computing device 1310 may be disposed between NMD 105 and network 130B. In some embodiments, link 1300 may include a communications link. In various embodiments, link 1300 may include one or more of a public switched telephone network (PSTN), a portion of a PSTN, a PSTN circuit, a cable (television) based network, a satellite-based system, and/or a fiber based network, among others. In some embodiments, link 1300 may operate at and/or below a transfer rate. In one example, link 1300 may include a T-1 circuit and be operable to perform data communications at and/or below 1.54 mega bits per second (mbps). In a second example, link 1300 may include a T-3 (or DS-3) circuit and be operable to perform data communications at and/or below 45 mbps. In another example, link 1300 may include a cable (television) based network communication connection, and the cable (television) based network communication connection may be operable to transfer data from NMD 105 at and/or below 728 kbps and transfer data to NMD 105 at and/or below 1 mpbs. In various embodiments, link 1300 may include maximum data transfer rate limits below maximum transfer rate limits of associated with network 130A and/or network 130B.

In some embodiments, each of NMD 105 and computing device 1310 may include routing operability to interface with link 1300. Moreover, each of NMD 105 and computing device 1310 may provide various qualities of services and/or network traffic prioritization through link 1300 based on various the methods and/or systems described herein. In various embodiments, various qualities of services and/or network traffic prioritization may be used, since link 1300 may include lesser communication transfer rates than network 130A and/or network 130B.

It is noted that, in various embodiment, one or more of the method elements described herein may be performed in varying orders, may be performed concurrently with one or more of the other method elements, or may be omitted. Additional method elements may be performed as desired. In various embodiments, concurrently may mean simultaneously. In some embodiments, concurrently may mean apparently simultaneously according to some metric. For example, two or more method elements may be performed such that they appear to be simultaneous to a human. It is also noted that, in various embodiments, one or more of the system elements described herein may be omitted and additional system elements may be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
receiving, from a first network, a first plurality of packets associated with a first network identification information;

determining a first transfer rate based on the first network identification;

permitting transmission of the first plurality of packets to a second network at a first rate no less than the first transfer rate;

receiving, from the first network, a second plurality of packets of a first data communication from a first computing device application;

determining a first computing device application classification from a plurality of computing device application classifications based on at least one of the second plurality of packets;

determining a second transfer rate based on the first computing device application classification;

permitting transmission of the second plurality of packets to the second network at a second rate no greater than the second transfer rate;

receiving input, from a user, associated with the first computing device application classification and a transfer rate greater than the second transfer rate;

receiving, from the first network, a third plurality of packets of a second data communication from the first computing device application;

determining the first computing device application classification from the plurality of computing device application classifications based on at least one of the third plurality of packets;

determining a third transfer rate based on the first computing device application classification and the input from the user, wherein the third transfer rate is greater than the second transfer rate; and permitting transmission of the third plurality of packets to the second network at a third rate no greater than the third transfer rate;

wherein the input from the user includes at least one of compensation information, credit card information, prepaid card information, username, password information, acceptance information, coupon information, and access code information;

wherein the at least one of the compensation information, the credit card information, the prepaid card information, the username, the password information, the acceptance information, the coupon information, and the access code information is associated with an account associated with the user; and in response to receiving the input, from the user, associated with the first computing device application classification and the transfer rate greater than the second transfer rate, debiting the account associated with the user.

2. The method of claim 1, wherein determining the first computing device application classification from the plurality of computing device application classifications based on the at least one of the second plurality of packets includes determining an application protocol associated with the first computing device application classification.

3. The method of claim 1, wherein determining the first computing device application classification from the plurality of computing device application classifications based on the at least one of the second plurality of packets includes determining a pattern associated with the first computing device application classification.

4. The method of claim 3, wherein determining the pattern associated with the first computing device application classification includes using one more of a neural network, a time-delay neural network, a Bayesian classifier, and/or a learning vector quantization system.

5. The method of claim 1, wherein the first network identification information is associated with a back office device.

6. The method of claim 5, wherein the back office device includes one or more of a cash register, a credit card information reader, a smart card reader, a radio frequency identification (RFID) tag reader, a barcode reader, a remote order placing device, and/or a camera.

7. The method of claim 1, wherein the first network identification information includes one or more of an identification of a first computing device, first access point identification information, a first media access control (MAC) address, first service set identification information, a first virtual local area network (VLAN) identification, a first wireless communication channel identification, a first physical port identification, and/or a first Internet protocol (IP) address.

8. The method of claim 1, wherein permitting transmission of the second plurality of packets to the second network at the second rate no greater than the second transfer rate includes discarding at least one packet of the second plurality of packets.

9. A computer readable memory medium comprising instructions, which when executed on a processing system, cause the processing system to perform:

receiving, from a first network, a first plurality of packets associated with a first network identification information;

determining a first transfer rate based on the first network identification;

permitting transmission of the first plurality of packets to a second network at a first rate no less than the first transfer rate;

receiving, from the first network, a second plurality of packets of a first data communication from a first computing device application;

determining a first computing device application classification from a plurality of computing device application classifications based on at least one of the second plurality of packets;

determining a second transfer rate based on the first computing device application classification;

permitting transmission of the second plurality of packets to the second network at a second rate no greater than the second transfer rate;

receiving input, from a user, associated with the first computing device application classification and a transfer rate greater than the second transfer rate;

receiving, from the first network, a third plurality of packets of a second data communication from the first computing device application;

determining the first computing device application classification from the plurality of computing device application classifications based on at least one of the third plurality of packets;

determining a third transfer rate based on the first computing device application classification and the input from the user, wherein the third transfer rate is greater than the second transfer rate; and permitting transmission of the third plurality of packets to the second network at a third rate no greater than the third transfer rate;

wherein the input from the user includes at least one of compensation information, credit card information, prepaid card information, username, password information, acceptance information, coupon information, and access code information;

wherein the at least one of the compensation information, the credit card information, the prepaid card information, the username, the password information, the acceptance information the coupon information, and the access code information is associated with an account associated with the user, in response to receiving the input, from the user, associated with the first computing device application classification and the transfer rate greater than the second transfer rate, debiting the account associated with the user.

10. The computer readable memory medium of claim 9, wherein in performing said determining the first computing device application classification from the plurality of computing device application classifications based on the at least one of the second plurality of packets, the computer readable medium further comprising instructions, which when executed on the processing system, cause the processing system to perform determining an application protocol associated with the first computing device application classification.

11. The computer readable memory medium of claim 9, wherein in performing said determining the first computing device application classification from the plurality of computing device application classifications based on the at least one of the second plurality of packets, the computer readable medium further comprising instructions, which when executed on the processing system, cause the processing system to perform determining a pattern associated with the first computing device application classification.

12. The computer readable memory medium of claim 11, wherein in performing said determining the pattern associated with the first computing device application classification, the computer readable medium further comprising instructions, which when executed on the processing system, cause the processing system to perform using one more of a neural network, a time-delay neural network, a Bayesian classifier, and/or a learning vector quantization system.

13. The computer readable memory medium of claim 9, wherein the first network identification information is associated with a back office device.

14. The computer readable memory medium of claim 13, wherein the back office device includes one or more of a cash register, a credit card information reader, a smart card reader, a radio frequency identification (RFID) tag reader, a barcode reader, a remote order placing device, and/or a camera.

15. The computer readable memory medium of claim 9, wherein the first network identification information includes one or more of an identification of a first computing device, first access point identification information, a first media access control (MAC) address, first service set identification information, a first virtual local area network (VLAN) identification, a first wireless communication channel identification, a first physical port identification, and/or a first Internet protocol (IP) address.

16. The computer readable memory medium of claim 9, wherein in performing permitting transmission of the second plurality of packets to the second network at the second rate no greater than the second transfer rate, the computer readable medium further comprising instructions, which when executed on the processing system, cause the processing system to perform discarding at least one packet of the second plurality of packets.

17. A method, comprising:
receiving, from a first network, a first plurality of packets of a first data communication from a first computing device application;
determining a first computing device application classification from a plurality of computing device application classifications based on at least one of the first plurality of packets;
determining a first transfer rate based on the first computing device application classification;
permitting transmission of the first plurality of packets to the second network at a first rate no less than the first transfer rate;
receiving input, from a user, associated with the first computing device application classification and a transfer rate greater than the first transfer rate;
receiving, from the first network, a second plurality of packets of a second data communication from the first computing device application;
determining the first computing device application classification from the plurality of computing device application classifications based on at least one of the second plurality of packets;
determining a second transfer rate based on the first computing device application classification and the input from the user, wherein the second transfer rate is greater than the first transfer rate;
permitting transmission of the second plurality of packets to the second network at a second rate no greater than the second transfer rate;
wherein the input from the user includes at least one of compensation information, credit card information, prepaid card information, username, password information, acceptance information, coupon information, and access code information;
wherein the at least one of the compensation information, the credit card information, the prepaid card information, the username, the password information, the acceptance information, the coupon information, and the access code information is associated with an account associated with the user; and
in response to receiving the input, from the user, associated with the first computing device application classification and the transfer rate greater than the second transfer rate, debiting the account associated with the user.

18. The method of claim 17, further comprising:
receiving, from the first network, a third plurality of packets of a third data communication from a second computing device application;
determining a second computing device application classification from the plurality of computing device application classifications based on at least one of the third plurality of packets;
determining a third transfer rate based on the second computing device application classification; and
permitting transmission of the third plurality of packets to the second network at a third rate no greater than the third transfer rate.

19. A computer readable memory medium comprising instructions, which when executed on a processing system, cause the processing system to perform:
receiving, from a first network, a first plurality of packets of a first data communication from a first computing device application;
determining a first computing device application classification from a plurality of computing device application classifications based on at least one of the first plurality of packets;
determining a first transfer rate based on the first computing device application classification;

permitting transmission of the first plurality of packets to the second network at a first rate no less than the first transfer rate;

receiving input, from a user, associated with the first computing device application classification and a transfer rate greater than the first transfer rate;

receiving, from the first network, a second plurality of packets of a second data communication from the first computing device application;

determining the first computing device application classification from the plurality of computing device application classifications based on at least one of the second plurality of packets;

determining a second transfer rate based on the first computing device application classification and the input from the user, wherein the second transfer rate is greater than the first transfer rate; and permitting transmission of the second plurality of packets to the second network at a second rate no greater than the second transfer rate;

wherein the input from the user includes at least one of compensation information, credit card information, prepaid card information, username, password information, acceptance information, coupon information, and access code information;

wherein the at least one of the compensation information, the credit card information, the prepaid card information, the username, the password information, the acceptance information, the coupon information, and the access code information is associated with an account associated with the user; and in response to receiving the input, from the user, associated with the first computing device application classification and the transfer rate greater than the second transfer rate, debiting the account associated with the user.

20. A system, comprising:

a first processor;

a first memory medium coupled to the first processor;

a first network connection coupled to the processor;

a second processor;

a second memory medium coupled to the second processor;

a second network connection coupled to the second processor;

a third network connection coupled to the first processor and coupled to the second processor;

wherein the first network connection is associated with a first maximum transfer rate;

wherein the second network connection is associated with a second maximum transfer rate;

wherein the third network connection is associated with a third maximum transfer rate;

wherein the third maximum transfer rate is less than the first maximum transfer rate and wherein the third maximum transfer rate is less than the second maximum transfer rate;

wherein the first memory medium includes program instructions executable by the first processor to:

receive, through the first network connection, a first plurality of packets associated with first network identification information;

determine a first transfer rate based on the first network identification information;

permit transmission of the first plurality of packets through the third network connection at a first rate no less than the first transfer rate;

receive, through the first network connection, a second plurality packets;

determine a first application classification of the second plurality of packets;

determine a second transfer rate based on the first application classification and the first transfer rate, wherein the second transfer rate combined with the first transfer rate does not exceed the third maximum transfer rate; and permit transmission of the second plurality of packets through the third network connection at a second rate no greater than the second transfer rate;

wherein the second memory medium includes program instructions executable by the second processor to:

receive, through the second network connection, a third plurality of packets associated with the first network identification information;

determine a third transfer rate based on the first network identification information;

permit transmission of the third plurality of packets through the third network connection at a third rate no less than the third transfer rate;

receive, through the second network connection, a fourth plurality of packets;

determine a second application classification of the fourth plurality of packets;

determine a fourth transfer rate based on the second application classification and the third transfer rate, wherein the fourth transfer rate combined with the third transfer rate does not exceed the third maximum transfer rate; and permit transmission of the fourth plurality of packets through the third network connection at a fourth rate no greater than the fourth transfer rate;

wherein input to the system from a user includes at least one of compensation information, credit card information, prepaid card information, username, password information, acceptance information, coupon information, and access code information, wherein the at least one of the compensation information, the credit card information, the prepaid card information, the username, the password information, the acceptance information, the coupon information, and the access code information is associated with an account associated with the user; and in response to receiving the input, from the user, associated with the first computing device application classification and the transfer rate greater than the second transfer rate, debiting the account associated with the user.

21. The system of claim 20, wherein the first application classification is the second application classification.

22. The system of claim 20, wherein to permit transmission of the second plurality of packets through the third network connection at the second rate no greater than the second transfer rate, the first memory medium further includes program instructions executable by the first processor to:

queue at least a portion of the second plurality of packets; and de-queue the at least the portion of the second plurality of packets.

23. The system of claim 20, wherein to permit transmission of the fourth plurality of packets through the third network connection at the fourth rate no greater than the fourth transfer rate, the second memory medium further includes program instructions executable by the second processor to:

queue at least a portion of the fourth plurality of packets; and de-queue the at least the portion of the fourth plurality of packets.

24. The system of claim 20, wherein the second network connection includes a connection to an Internet.

25. The system of claim 20, wherein the third network connection includes a telecommunications circuit.

26. The system of claim 20, wherein the first network identification information includes one or more of an identification of a first computing device, first network distribution unit identification information, a first media access control (MAC) address, first service set identification information, a first virtual local area network (VLAN) identification, a first wireless communication channel identification, a first physical port identification, and/or a first Internet protocol (IP) address.

* * * * *